US010257396B2

(12) United States Patent
Phillips et al.

(10) Patent No.: US 10,257,396 B2
(45) Date of Patent: *Apr. 9, 2019

(54) PORTABLE VIDEO AND IMAGING SYSTEM

(71) Applicant: Digital Ally, Inc., Lenexa, KS (US)

(72) Inventors: Steve Phillips, Olathe, KS (US); Jason R. Troxel, Lee's Summit, MO (US)

(73) Assignee: Digital Ally, Inc., Lenexa, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,599

(22) Filed: Jul. 17, 2017

(65) Prior Publication Data

US 2017/0318202 A1 Nov. 2, 2017

Related U.S. Application Data

(63) Continuation of application No. 14/991,607, filed on Jan. 8, 2016, now Pat. No. 9,712,730, which is a
(Continued)

(51) Int. Cl.
*H04N 5/77* (2006.01)
*H04N 7/18* (2006.01)
(Continued)

(52) U.S. Cl.
CPC ........... *H04N 5/2252* (2013.01); *F16M 11/10* (2013.01); *F16M 11/14* (2013.01);
(Continued)

(58) Field of Classification Search
CPC ...... H04N 5/2252; H04N 5/2251; H04N 5/77; H04N 5/907; H04N 5/765; H04N 5/775;
(Continued)

(56) References Cited

U.S. PATENT DOCUMENTS

| 4,409,670 A | 10/1983 | Herndon et al. |
| 4,789,904 A | 12/1988 | Peterson |

(Continued)

FOREIGN PATENT DOCUMENTS

| DE | 102010019451 A1 | 11/2011 |
| GB | 2273624 | 6/1994 |

(Continued)

OTHER PUBLICATIONS

Invalidity Chart for International Publication No. WO2014/000161 Oct. 31, 2017 (Resubmitted).

(Continued)

*Primary Examiner* — Pritham D Prabhakher
(74) *Attorney, Agent, or Firm* — Erise IP, P.A.

(57) ABSTRACT

A portable video and imaging system includes a camera for capturing video of an event, and a video recording device for recording the captured video of the event. The camera is housed in a first housing, the recording device is housed in a second housing, and the first and second housings are physically separate. Various embodiments provide for the system to be mounted to a user's body, an article of clothing, such as a shirt or a hat, to a vehicle, or to an ancillary component carried by the user, such as a firearm.

20 Claims, 18 Drawing Sheets

Related U.S. Application Data continuation of application No. 14/575,433, filed on Dec. 18, 2014, now Pat. No. 9,237,262, which is a continuation of application No. 14/040,329, filed on Sep. 27, 2013, now Pat. No. 9,019,431.

(60) Provisional application No. 61/707,348, filed on Sep. 28, 2012, provisional application No. 61/707,326, filed on Sep. 28, 2012.

(51) Int. Cl.
| | |
|---|---|
| *F16M 11/10* | (2006.01) |
| *F16M 11/14* | (2006.01) |
| *F16M 11/20* | (2006.01) |
| *F16M 13/04* | (2006.01) |
| *G03B 17/56* | (2006.01) |
| *G11B 27/10* | (2006.01) |
| *G11B 27/11* | (2006.01) |
| *G11B 27/34* | (2006.01) |
| *H04N 5/225* | (2006.01) |

(52) U.S. Cl.
CPC ........ *F16M 11/2078* (2013.01); *F16M 13/04* (2013.01); *G03B 17/561* (2013.01); *G03B 17/566* (2013.01); *G11B 27/102* (2013.01); *G11B 27/11* (2013.01); *G11B 27/34* (2013.01); *H04N 5/2251* (2013.01); *H04N 5/77* (2013.01); *H04N 7/185* (2013.01); *H04N 7/188* (2013.01); *G03B 2206/00* (2013.01)

(58) Field of Classification Search
CPC .......... H04N 5/781; H04N 5/782; H04N 5/85; H04N 7/142; H04N 7/14; H04N 7/183; H04N 7/185; H04N 7/188; H04N 9/7921; H04N 9/8042; H04N 9/8205; A61B 5/0024; A61B 5/7275; A61B 5/0402; A61B 5/0476; A61B 5/1112; A61B 5/1117; A61B 5/14542; A61B 5/681; A61B 5/7214; A61B 5/7465; A61B 7/04; G08B 21/02; G08B 13/19621; G08B 13/19669; G08B 25/007; H04M 1/15; H04M 1/05; H04M 1/0214; H04M 1/0283; H04M 1/18; F41C 33/02; F41C 33/048; F41C 33/041; F41C 33/0209; H04R 1/028; H04R 1/083; A45C 3/001; A45F 5/02; A45F 5/021; A45F 5/04; A45F 2200/0516; G06F 1/1628; A41B 1/08; A41D 27/20; A41D 1/002; A41C 33/045; A61M 5/1417; A61M 5/14244; G02B 21/0294; G02B 21/0288; G11B 27/102; G11B 27/11; G11B 27/34
USPC ........................................................ 348/376
See application file for complete search history.

(56) References Cited

U.S. PATENT DOCUMENTS

| | | |
|---|---|---|
| 4,863,130 A | 9/1989 | Marks, Jr. |
| 4,918,473 A | 4/1990 | Blackshear |
| 5,027,104 A | 6/1991 | Reid |
| 5,096,287 A | 3/1992 | Kaikinami et al. |
| 5,111,289 A | 5/1992 | Lucas et al. |
| 5,289,321 A | 2/1994 | Secor |
| 5,381,155 A | 1/1995 | Gerber |
| 5,408,330 A | 4/1995 | Squicciarii et al. |
| 5,446,659 A | 8/1995 | Yamawaki |
| 5,453,939 A | 9/1995 | Hoffman et al. |
| 5,473,729 A | 12/1995 | Bryant et al. |
| 5,479,149 A | 12/1995 | Pike |
| 5,497,419 A | 3/1996 | Hill |
| 5,526,133 A | 6/1996 | Paff |
| 5,585,798 A | 12/1996 | Yosioka et al. |
| 5,642,285 A | 6/1997 | Woo et al. |
| 5,668,675 A | 9/1997 | Fredricks |
| 5,689,442 A | 11/1997 | Swanson et al. |
| 5,742,336 A | 4/1998 | Lee |
| 5,752,632 A | 5/1998 | Sanderson et al. |
| 5,798,458 A | 8/1998 | Monroe |
| 5,815,093 A | 9/1998 | Kikinis |
| 5,850,613 A | 12/1998 | Bullecks |
| 5,878,283 A | 3/1999 | House et al. |
| 5,886,739 A | 3/1999 | Winningstad |
| 5,890,079 A | 3/1999 | Levine |
| 5,926,210 A | 7/1999 | Hackett et al. |
| 5,962,806 A | 10/1999 | Coakley et al. |
| 5,978,017 A | 11/1999 | Tino |
| 5,983,161 A | 11/1999 | Lemelson et al. |
| 5,996,023 A | 11/1999 | Winter et al. |
| 6,008,841 A | 12/1999 | Charlson |
| 6,028,528 A | 2/2000 | Lorenzetti et al. |
| 6,052,068 A | 4/2000 | Price R-W et al. |
| 6,097,429 A | 8/2000 | Seeley et al. |
| 6,100,806 A | 8/2000 | Gaukel |
| 6,121,881 A | 9/2000 | Bieback et al. |
| 6,141,609 A | 10/2000 | Herdeg et al. |
| 6,141,611 A | 10/2000 | Mackey et al. |
| 6,163,338 A | 12/2000 | Johnson et al. |
| 6,175,300 B1 | 1/2001 | Kendrick |
| 6,298,290 B1 | 10/2001 | Abe et al. |
| 6,310,541 B1 | 10/2001 | Atkins |
| 6,314,364 B1 | 11/2001 | Nakamura |
| 6,324,053 B1 | 11/2001 | Kamijo |
| 6,326,900 B2 | 12/2001 | Deline et al. |
| 6,333,694 B2 | 12/2001 | Pierce et al. |
| 6,333,759 B1 | 12/2001 | Mazzilli |
| 6,370,475 B1 | 4/2002 | Breed et al. |
| RE37,709 E | 5/2002 | Dukek |
| 6,389,340 B1 | 5/2002 | Rayner |
| 6,396,403 B1 | 5/2002 | Haner |
| 6,405,112 B1 | 6/2002 | Rayner |
| 6,449,540 B1 | 9/2002 | Rayner |
| 6,452,572 B1 | 9/2002 | Fan et al. |
| 6,490,409 B1 | 12/2002 | Walker |
| 6,518,881 B2 | 2/2003 | Monroe |
| 6,525,672 B2 | 2/2003 | Chainer et al. |
| 6,546,119 B2 | 4/2003 | Ciolli et al. |
| 6,560,463 B1 | 5/2003 | Santhoff |
| 6,563,532 B1 | 5/2003 | Strub et al. |
| 6,591,242 B1 | 7/2003 | Karp et al. |
| 6,681,195 B1 | 1/2004 | Poland et al. |
| 6,690,268 B2 | 2/2004 | Schofield et al. |
| 6,697,103 B1 | 2/2004 | Fernandez et al. |
| 6,718,239 B2 | 4/2004 | Rayer |
| 6,727,816 B1 | 4/2004 | Helgeson |
| 6,748,792 B1 | 6/2004 | Freund et al. |
| 6,823,621 B2 | 11/2004 | Gotfried |
| 6,831,556 B1 | 12/2004 | Boykin |
| 6,856,873 B2 | 2/2005 | Breed et al. |
| 6,883,694 B2 | 4/2005 | Abelow |
| 6,970,183 B1 | 11/2005 | Monroe |
| 7,012,632 B2 | 3/2006 | Freeman et al. |
| 7,034,683 B2 | 4/2006 | Ghazarian |
| D520,738 S | 5/2006 | Tarantino |
| 7,038,590 B2 | 5/2006 | Hoffman et al. |
| 7,088,387 B1 | 8/2006 | Freeman et al. |
| 7,119,832 B2 | 10/2006 | Blanco et al. |
| 7,126,472 B2 | 10/2006 | Kraus et al. |
| 7,147,155 B2 | 12/2006 | Weekes |
| 7,180,407 B1 | 2/2007 | Guo et al. |
| 7,190,822 B2 | 3/2007 | Gammenthaler |
| 7,363,742 B2 | 4/2008 | Nerheim |
| 7,371,021 B2 | 5/2008 | Ross et al. |
| 7,421,024 B2 | 9/2008 | Castillo |
| 7,436,143 B2 | 10/2008 | Lakshmanan et al. |
| 7,436,955 B2 | 10/2008 | Yan et al. |
| 7,448,996 B2 | 11/2008 | Khanuja et al. |
| 7,456,875 B2 | 11/2008 | Kashiwa |
| 7,496,140 B2 | 2/2009 | Winningstad et al. |

(56) References Cited

U.S. PATENT DOCUMENTS

| | | |
|---|---|---|
| 7,500,794 B1 | 3/2009 | Clark |
| 7,508,941 B1 | 3/2009 | O'Toole, Jr. et al. |
| 7,536,457 B2 | 5/2009 | Miller |
| 7,539,533 B2 | 5/2009 | Tran |
| 7,561,037 B1 | 7/2009 | Monroe |
| 7,594,305 B2 | 9/2009 | Moore |
| 7,602,301 B1 | 10/2009 | Stirling et al. |
| 7,656,439 B1 | 2/2010 | Manico et al. |
| 7,659,827 B2 | 2/2010 | Gunderson et al. |
| 7,680,947 B2 | 3/2010 | Nicholl et al. |
| 7,697,035 B1 | 4/2010 | Suber, III et al. |
| 7,804,426 B2 | 9/2010 | Etcheson |
| 7,806,525 B2 | 10/2010 | Howell et al. |
| 7,853,944 B2 | 12/2010 | Choe |
| 7,944,676 B2 | 5/2011 | Smith et al. |
| 8,077,029 B1 | 12/2011 | Daniel et al. |
| 8,121,306 B2 | 2/2012 | Cilia et al. |
| 8,175,314 B1 | 5/2012 | Webster |
| 8,269,617 B2 | 9/2012 | Cook et al. |
| 8,314,708 B2 | 11/2012 | Gunderson et al. |
| 8,350,907 B1 | 1/2013 | Blanco et al. |
| 8,356,438 B2 | 1/2013 | Brundula et al. |
| 8,373,567 B2 | 2/2013 | Denson |
| 8,373,797 B2 | 2/2013 | Ishii et al. |
| 8,384,539 B2 | 2/2013 | Denny et al. |
| 8,446,469 B2 | 5/2013 | Blanco et al. |
| 8,456,293 B1 | 6/2013 | Trundle et al. |
| 8,508,353 B2 | 8/2013 | Cook et al. |
| 8,594,485 B2 | 11/2013 | Brundula |
| 8,606,492 B1 | 12/2013 | Botnen |
| 8,676,428 B2 | 3/2014 | Richardson et al. |
| 8,690,365 B1 | 4/2014 | Williams |
| 8,707,758 B2 | 4/2014 | Keays |
| 8,725,462 B2 | 5/2014 | Jain et al. |
| 8,744,642 B2 | 6/2014 | Nemat-Nasser et al. |
| 8,780,205 B2 | 7/2014 | Boutell et al. |
| 8,781,292 B1 | 7/2014 | Ross et al. |
| 8,805,431 B2 | 8/2014 | Vasavada et al. |
| 8,849,501 B2 | 9/2014 | Cook et al. |
| 8,854,199 B2 | 10/2014 | Cook et al. |
| 8,887,208 B1 | 11/2014 | Merrit et al. |
| 8,890,954 B2 * | 11/2014 | O'Donnell ............ G08C 17/02 348/143 |
| 8,930,072 B1 | 1/2015 | Lambert et al. |
| 8,934,045 B2 * | 1/2015 | Karn ................ H04N 5/23241 348/211.99 |
| 8,989,914 B1 | 3/2015 | Nemat-Nasser et al. |
| 8,996,234 B1 | 3/2015 | Tamari et al. |
| 8,996,240 B2 * | 3/2015 | Plante .................... G07C 5/008 701/33.4 |
| 9,002,313 B2 * | 4/2015 | Sink ..................... B60Q 1/2611 340/691.1 |
| 9,003,474 B1 | 4/2015 | Smith |
| 9,058,499 B1 | 6/2015 | Smith |
| 9,122,082 B2 | 9/2015 | Abreau |
| 9,123,241 B2 * | 9/2015 | Grigsby ............... G08G 1/0962 |
| 9,164,543 B2 | 10/2015 | Minn et al. |
| 9,253,452 B2 | 2/2016 | Ross et al. |
| 9,591,255 B2 | 3/2017 | Sakiewica et al. |
| 9,728,228 B2 * | 8/2017 | Palmer ................. G11B 27/105 |
| 2001/0033661 A1 | 10/2001 | Prokoski |
| 2002/0013517 A1 | 1/2002 | West et al. |
| 2002/0019696 A1 | 2/2002 | Kruse |
| 2002/0032510 A1 | 3/2002 | Tumball et al. |
| 2002/0044065 A1 | 4/2002 | Quist et al. |
| 2002/0049881 A1 | 4/2002 | Sugimura |
| 2002/0084130 A1 | 7/2002 | Der Gazarian et al. |
| 2002/0131768 A1 | 9/2002 | Gammenthaler |
| 2002/0135336 A1 | 9/2002 | Zhou et al. |
| 2002/0159434 A1 | 10/2002 | Gosior et al. |
| 2002/0191952 A1 | 12/2002 | Fiore et al. |
| 2003/0040917 A1 | 2/2003 | Fiedler |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081934 A1 | 5/2003 | Kirmuss |
| 2003/0081935 A1 | 5/2003 | Kirmuss |
| 2003/0081942 A1 | 5/2003 | Melnyk et al. |
| 2003/0095688 A1 | 5/2003 | Kirmuss |
| 2003/0106917 A1 | 6/2003 | Shelter et al. |
| 2003/0133018 A1 | 7/2003 | Ziemkowski |
| 2003/0151510 A1 | 8/2003 | Quintana et al. |
| 2003/0184674 A1 | 10/2003 | Manico et al. |
| 2003/0185417 A1 | 10/2003 | Alattar et al. |
| 2003/0215010 A1 | 11/2003 | Kashiwa |
| 2003/0215114 A1 | 11/2003 | Kyle |
| 2003/0222982 A1 | 12/2003 | Hamdan et al. |
| 2004/0008255 A1 | 1/2004 | Lewellen |
| 2004/0043765 A1 | 3/2004 | Tolhurst |
| 2004/0143373 A1 | 6/2004 | Ennis |
| 2004/0145457 A1 | 7/2004 | Schofield et al. |
| 2004/0150717 A1 | 8/2004 | Page et al. |
| 2004/0168002 A1 | 8/2004 | Accarie et al. |
| 2004/0199785 A1 | 10/2004 | Pederson |
| 2004/0223054 A1 | 11/2004 | Rotholtz |
| 2004/0243734 A1 | 12/2004 | Kitagawa et al. |
| 2004/0267419 A1 | 12/2004 | Jing |
| 2005/0030151 A1 | 2/2005 | Singh |
| 2005/0046583 A1 | 3/2005 | Richards |
| 2005/0050266 A1 | 3/2005 | Haas et al. |
| 2005/0068169 A1 | 3/2005 | Copley et al. |
| 2005/0068417 A1 | 3/2005 | Kreiner et al. |
| 2005/0083404 A1 | 4/2005 | Pierce et al. |
| 2005/0094966 A1 | 5/2005 | Elberbaum |
| 2005/0100329 A1 | 5/2005 | Lao et al. |
| 2005/0101334 A1 | 5/2005 | Brown et al. |
| 2005/0134966 A1 | 5/2005 | Burgner |
| 2005/0132200 A1 | 6/2005 | Jaffe et al. |
| 2005/0151852 A1 | 7/2005 | Jomppanen |
| 2005/0035161 A1 | 8/2005 | Shioda |
| 2005/0185438 A1 | 8/2005 | Ching |
| 2005/0206532 A1 | 9/2005 | Lock |
| 2005/0206741 A1 | 9/2005 | Raber |
| 2005/0228234 A1 | 10/2005 | Yang |
| 2005/0232469 A1 | 10/2005 | Schofield et al. |
| 2005/0243171 A1 | 11/2005 | Ross, Sr. et al. |
| 2005/0258942 A1 | 11/2005 | Manasseh et al. |
| 2006/0009238 A1 | 1/2006 | Stanco et al. |
| 2006/0028811 A1 | 2/2006 | Ross, Jr. et al. |
| 2006/0055786 A1 | 3/2006 | Olilla |
| 2006/0082730 A1 * | 4/2006 | Franks ................... F41A 17/06 352/95 |
| 2006/0158968 A1 | 7/2006 | Vanman et al. |
| 2006/0164220 A1 | 7/2006 | Harter, Jr. et al. |
| 2006/0164534 A1 | 7/2006 | Robinson et al. |
| 2006/0170770 A1 | 8/2006 | MacCarthy |
| 2006/0176149 A1 | 8/2006 | Douglas |
| 2006/0183505 A1 | 8/2006 | Willrich |
| 2006/0193749 A1 | 8/2006 | Ghazarian et al. |
| 2006/0203090 A1 | 9/2006 | Wang et al. |
| 2006/0220826 A1 | 10/2006 | Rast |
| 2006/0225253 A1 | 10/2006 | Bates |
| 2006/0244601 A1 | 11/2006 | Nishimura |
| 2006/0256822 A1 | 11/2006 | Kwong et al. |
| 2006/0270465 A1 | 11/2006 | Lee et al. |
| 2006/0271287 A1 | 11/2006 | Gold et al. |
| 2006/0274166 A1 | 12/2006 | Lee et al. |
| 2006/0274828 A1 | 12/2006 | Siemens et al. |
| 2006/0276200 A1 | 12/2006 | Radhakrishnan et al. |
| 2006/0282021 A1 | 12/2006 | DeVaul et al. |
| 2006/0287821 A1 | 12/2006 | Lin |
| 2006/0293571 A1 | 12/2006 | Bao et al. |
| 2007/0021134 A1 | 1/2007 | Liou |
| 2007/0064108 A1 | 3/2007 | Haler |
| 2007/0067079 A1 | 3/2007 | Kosugi |
| 2007/0091557 A1 | 4/2007 | Kim et al. |
| 2007/0102508 A1 | 5/2007 | Mcintosh |
| 2007/0117083 A1 | 5/2007 | Winneg et al. |
| 2007/0132567 A1 | 6/2007 | Schofield et al. |
| 2007/0152811 A1 | 7/2007 | Anderson |
| 2007/0172053 A1 | 7/2007 | Poirier |
| 2007/0177023 A1 | 8/2007 | Beuhler et al. |
| 2007/0195939 A1 * | 8/2007 | Sink ..................... B60Q 1/2611 379/37 |

(56) References Cited

U.S. PATENT DOCUMENTS

| | | |
|---|---|---|
| 2007/0199076 A1 | 8/2007 | Rensin et al. |
| 2007/0213088 A1* | 9/2007 | Sink .................... G08B 27/006 455/524 |
| 2007/0229350 A1 | 10/2007 | Scalisi et al. |
| 2007/0257781 A1 | 11/2007 | Denson |
| 2007/0257782 A1 | 11/2007 | Etcheson |
| 2007/0257804 A1 | 11/2007 | Gunderson et al. |
| 2007/0257815 A1 | 11/2007 | Gunderson et al. |
| 2007/0260361 A1 | 11/2007 | Etcheson |
| 2007/0268158 A1 | 11/2007 | Gunderson et al. |
| 2007/0271105 A1 | 11/2007 | Gunderson et al. |
| 2007/0274705 A1 | 11/2007 | Kashiwa |
| 2007/0277352 A1 | 12/2007 | Maron et al. |
| 2007/0285222 A1 | 12/2007 | Zadnikar |
| 2007/0287425 A1 | 12/2007 | Bates |
| 2007/0297320 A1 | 12/2007 | Brummette et al. |
| 2008/0001735 A1 | 1/2008 | Tran |
| 2008/0002031 A1 | 1/2008 | Cana et al. |
| 2008/0002599 A1 | 2/2008 | Denny et al. |
| 2008/0030580 A1 | 2/2008 | Kashhiawa et al. |
| 2008/0042825 A1 | 2/2008 | Denny et al. |
| 2008/0043736 A1 | 2/2008 | Stanley |
| 2008/0049830 A1 | 2/2008 | Richardson |
| 2008/0063252 A1 | 3/2008 | Dobbs et al. |
| 2008/0084473 A1 | 4/2008 | Romanowich |
| 2008/0100705 A1 | 5/2008 | Kister et al. |
| 2008/0122603 A1 | 5/2008 | Piante et al. |
| 2008/0129518 A1 | 6/2008 | Carlton-Foss |
| 2008/0143481 A1 | 6/2008 | Abraham et al. |
| 2008/0144705 A1 | 6/2008 | Rackin et al. |
| 2008/0169929 A1 | 7/2008 | Albertson et al. |
| 2008/0170130 A1 | 7/2008 | Ollila et al. |
| 2008/0175565 A1* | 7/2008 | Takakura ............. G11B 27/034 386/341 |
| 2008/0211906 A1 | 9/2008 | Lovric |
| 2008/0222849 A1 | 9/2008 | Lavoie |
| 2008/0239064 A1 | 10/2008 | Iwasaki |
| 2008/0246656 A1 | 10/2008 | Ghazarian |
| 2008/0266118 A1 | 10/2008 | Pierson et al. |
| 2008/0307435 A1 | 12/2008 | Rehman |
| 2008/0316314 A1 | 12/2008 | Bedell et al. |
| 2009/0002491 A1 | 1/2009 | Haler |
| 2009/0002556 A1 | 1/2009 | Manapragada et al. |
| 2009/0027499 A1 | 1/2009 | Nicholl |
| 2009/0052685 A1 | 2/2009 | Cilia et al. |
| 2009/0070820 A1 | 3/2009 | Li |
| 2009/0085740 A1* | 4/2009 | Klein ............... G08B 13/19695 340/540 |
| 2009/0109292 A1* | 4/2009 | Ennis .................... A42B 3/042 348/158 |
| 2009/0122142 A1 | 5/2009 | Shapley |
| 2009/0135007 A1 | 5/2009 | Donovan et al. |
| 2009/0169068 A1 | 7/2009 | Okamoto |
| 2009/0189981 A1 | 7/2009 | Siann et al. |
| 2009/0195686 A1 | 8/2009 | Shintani |
| 2009/0207252 A1 | 8/2009 | Raghunath |
| 2009/0213204 A1 | 8/2009 | Wong |
| 2009/0225189 A1 | 9/2009 | Morin |
| 2009/0243794 A1 | 10/2009 | Morrow |
| 2009/0251545 A1 | 10/2009 | Shekarri et al. |
| 2009/0252486 A1 | 10/2009 | Ross, Jr. et al. |
| 2009/0276708 A1 | 11/2009 | Smith et al. |
| 2009/0294538 A1 | 12/2009 | Wihlborg et al. |
| 2009/0324203 A1 | 12/2009 | Wiklof |
| 2010/0045798 A1 | 2/2010 | Sugimoto et al. |
| 2010/0050734 A1 | 3/2010 | Chou |
| 2010/0060747 A1 | 3/2010 | Woodman |
| 2010/0097221 A1 | 4/2010 | Kriener et al. |
| 2010/0106707 A1 | 4/2010 | Brown et al. |
| 2010/0118147 A1 | 5/2010 | Dorneich et al. |
| 2010/0122435 A1 | 5/2010 | Markham |
| 2010/0123779 A1 | 5/2010 | Snyder et al. |
| 2010/0177193 A1 | 7/2010 | Flores |
| 2010/0177891 A1 | 7/2010 | Keidar et al. |
| 2010/0188201 A1 | 7/2010 | Cook et al. |
| 2010/0191411 A1 | 7/2010 | Cook et al. |
| 2010/0194885 A1 | 8/2010 | Plaster |
| 2010/0217836 A1 | 8/2010 | Rofougaran |
| 2010/0238009 A1 | 9/2010 | Cook et al. |
| 2010/0238262 A1 | 9/2010 | Kurtz et al. |
| 2010/0242076 A1 | 9/2010 | Potesta et al. |
| 2010/0265331 A1 | 10/2010 | Tanaka |
| 2010/0274816 A1 | 10/2010 | Guzik |
| 2010/0287473 A1 | 11/2010 | Recesso et al. |
| 2011/0006151 A1 | 1/2011 | Beard |
| 2011/0018998 A1 | 1/2011 | Guzik |
| 2011/0050904 A1 | 3/2011 | Anderson |
| 2011/0069151 A1 | 3/2011 | Orimoto |
| 2011/0084820 A1 | 4/2011 | Walter et al. |
| 2011/0094003 A1 | 4/2011 | Spiewak et al. |
| 2011/0098924 A1 | 4/2011 | Baladeta et al. |
| 2011/0129151 A1 | 6/2011 | Saito et al. |
| 2011/1015775 | 6/2011 | Smith et al. |
| 2011/0187895 A1 | 8/2011 | Cheng et al. |
| 2011/0261176 A1 | 10/2011 | Monaghan, Sr. et al. |
| 2011/0281547 A1 | 11/2011 | Cordero |
| 2011/0301971 A1 | 12/2011 | Roesch et al. |
| 2011/0314401 A1 | 12/2011 | Salisbury et al. |
| 2012/0038689 A1 | 2/2012 | Ishil |
| 2012/0056722 A1 | 3/2012 | Kawaguchi |
| 2012/0063736 A1 | 3/2012 | Simmons et al. |
| 2012/0120258 A1 | 5/2012 | Boutell et al. |
| 2012/0162436 A1 | 6/2012 | Cordell et al. |
| 2012/0188345 A1 | 7/2012 | Salow |
| 2012/0189286 A1 | 7/2012 | Takayama et al. |
| 2012/0230540 A1 | 9/2012 | Calman et al. |
| 2012/0257320 A1 | 10/2012 | Brundula et al. |
| 2012/0268259 A1 | 10/2012 | Igel et al. |
| 2012/0276954 A1 | 11/2012 | Kowalsky |
| 2013/0021153 A1 | 1/2013 | Keays |
| 2013/0033610 A1 | 2/2013 | Osborn |
| 2013/0035602 A1 | 2/2013 | Gemer |
| 2013/0080836 A1 | 3/2013 | Stergiou et al. |
| 2013/0096731 A1 | 4/2013 | Tamari et al. |
| 2013/0125000 A1 | 5/2013 | Flischhauser et al. |
| 2013/0148295 A1 | 6/2013 | Minn et al. |
| 2013/0222640 A1 | 8/2013 | Baek et al. |
| 2013/0225309 A1 | 8/2013 | Bentley et al. |
| 2013/0300563 A1 | 11/2013 | Glaze |
| 2013/0343571 A1 | 12/2013 | Lee |
| 2014/0037262 A1 | 2/2014 | Sako |
| 2014/0049636 A1 | 2/2014 | O'Donnell et al. |
| 2014/0092299 A1 | 4/2014 | Phillips et al. |
| 2014/0094992 A1 | 4/2014 | Lambert et al. |
| 2014/0098453 A1 | 4/2014 | Brundula et al. |
| 2014/0140575 A1 | 5/2014 | Wolf |
| 2014/0170602 A1 | 6/2014 | Reed |
| 2014/0192194 A1 | 7/2014 | Bedell et al. |
| 2014/0195105 A1 | 7/2014 | Lambert et al. |
| 2014/0195272 A1 | 7/2014 | Sadiq et al. |
| 2014/0210625 A1 | 7/2014 | Nemat-Nasser |
| 2014/0218544 A1 | 8/2014 | Senot et al. |
| 2014/0227671 A1 | 8/2014 | Olmstead et al. |
| 2014/0311215 A1 | 10/2014 | Keays et al. |
| 2014/0341532 A1 | 11/2014 | Marathe et al. |
| 2014/0355951 A1 | 12/2014 | Tabak |
| 2015/0050003 A1 | 2/2015 | Ross et al. |
| 2015/0050345 A1 | 2/2015 | Smyth et al. |
| 2015/0051502 A1 | 2/2015 | Ross |
| 2015/0053776 A1 | 3/2015 | Rose et al. |
| 2015/0078727 A1 | 3/2015 | Ross et al. |
| 2015/0088335 A1 | 3/2015 | Lambert et al. |
| 2015/0103246 A1 | 4/2015 | Phillips et al. |
| 2015/0229630 A1 | 8/2015 | Smith |
| 2015/0317368 A1 | 11/2015 | Rhoads et al. |
| 2015/0332424 A1 | 11/2015 | Kane et al. |
| 2015/0358549 A1 | 12/2015 | Cho et al. |
| 2016/0042767 A1 | 2/2016 | Araya et al. |
| 2016/0104508 A1 | 4/2016 | Chee et al. |
| 2016/0127695 A1 | 5/2016 | Zhang et al. |
| 2016/0165192 A1 | 6/2016 | Saatchi et al. |
| 2016/0364621 A1 | 12/2016 | Hill et al. |
| 2017/0070659 A1 | 3/2017 | Kievsky et al. |
| 2017/0195635 A1 | 7/2017 | Yokomitsu et al. |

(56) References Cited

U.S. PATENT DOCUMENTS

| | | |
|---|---|---|
| 2017/0230605 A1 | 8/2017 | Han et al. |
| 2017/0237950 A1 | 8/2017 | Araya et al. |
| 2017/0244884 A1 | 8/2017 | Burtey et al. |
| 2017/0277700 A1 | 9/2017 | Davis et al. |
| 2017/0287523 A1 | 10/2017 | Hodulik et al. |
| 2018/0023910 A1 | 1/2018 | Kramer |
| 2018/0050800 A1 | 2/2018 | Boykin et al. |

FOREIGN PATENT DOCUMENTS

| | | |
|---|---|---|
| GB | 2320389 | 5/1998 |
| GB | 2343252 | 5/2000 |
| GB | 2351055 | 12/2000 |
| GB | 2417151 | 2/2006 |
| GB | 2425427 | 10/2006 |
| GB | 2455885 | 7/2009 |
| GB | 2485804 A | 5/2012 |
| IE | 20090923 A1 | 9/2010 |
| JP | 294188 | 9/1993 |
| JP | 153298 | 6/1996 |
| JP | 198858 | 7/1997 |
| JP | 10076880 A | 3/1998 |
| JP | 210395 | 7/1998 |
| JP | 2000137263 A | 5/2000 |
| JP | 2005119631 A | 5/2005 |
| KR | 20-0236817 | 8/2001 |
| KR | 1050897 | 7/2011 |
| RU | 2383915 C2 | 3/2010 |
| RU | 107851 U1 | 8/2011 |
| RU | 124780 U1 | 2/2013 |
| WO | 9005076 | 5/1990 |
| WO | 9738526 | 10/1997 |
| WO | 9831146 | 7/1998 |
| WO | 9948308 | 9/1999 |
| WO | 0039556 | 7/2000 |
| WO | 0051360 | 8/2000 |
| WO | 0123214 A1 | 4/2001 |
| WO | 0249881 | 6/2002 |
| WO | 02095757 | 11/2002 |
| WO | 03049446 | 6/2003 |
| WO | 2004036926 A2 | 4/2004 |
| WO | 2009013526 A1 | 1/2009 |
| WO | 2012037139 A2 | 3/2012 |
| WO | 2012120083 A1 | 9/2012 |
| WO | 2014000161 A1 | 1/2014 |
| WO | 2014052898 A1 | 4/2014 |

OTHER PUBLICATIONS

Automation Systems Article, Know-How Bank Co. Ltd. Takes Leap Forward as a Company Specializing in R&D and Technology Consulting, published Jan. 2005.
Car Rear View Camera—Multimedia Rear View Mirror—4' LCD color monitor, Retrieved from the Internet: <URL:http://web.archive.org/web/20050209014751/http://laipac.com/multimedia-rear-mirror.htm>, Feb. 9, 2005.
ATC Chameleon. Techdad Review [Online] Jun. 19, 2013 [Retrieved on Dec. 30, 2015]. Retrieved from Internet. <URL:http://www.techdadreview.com/2013/06/19atc-chameleon/>.
"Breathalyzer." Wikipedia. Printed Date: Oct. 16, 2014; Date Page Last Modified: Sep. 14, 2014; <http://en.wikipedia.org/wiki/Breathalyzer>.
Dees, Tim; Taser Axon Flex: The next generation of body camera; <http://www.policeone.com/police-products/body-cameras/articles/527231-0-TASER-Axon-Flex-The-next-generation-of-body-camera/>, Date Posted: Mar. 12, 2012; Date Printed: Oct. 27, 2015.
Brown, TP-LINK TL-WDR3500 Wireless N600 Router Review, Mar. 6, 2013.
Controller Area Network (CAN) Overview, National Instruments White Paper, Aug. 1, 2014.
Daskam, Samuel W., Law Enforcement Armed Robbery Alarm System Utilizing Recorded Voice Addresses Via Police Radio Channels, Source: Univ. of Ky, Off of Res and Eng., Serv (UKY BU107), pp. 18-22, 1975.
*Digital Ally* vs. *Taser International, Inc.*, Case No. 2:16-cv-232 (CJM/TJ); US D. Kan, Defendant Taser International Inc.'s Preliminary Invalidity Contentions, Jul. 5, 2016.
Electronic Times Article, published Feb. 24, 2005.
Supplementary European Search Report dated Sep. 28, 2010 in European Patent Application No. 06803645.8; Applicant: Digital Ally, Inc.
W. Fincham, Data Recorders for Accident Investigation, Monitoring of Driver and Vehicle Performance (Digest No. 1997/122), Publication Date: Apr. 10, 1997, pp. 6/1-6/3.
Frankel, Harry; Riter, Stephen, Bernat, Andrew, Automated Imaging System for Border Control, Source: University of Kentucky, Office of Engineering Services, (Bulletin) UKY BU, pp. 169-173, Aug. 1986.
Freudenrich, Craig, Ph.D.; "How Breathalyzers Work—Why Test?." HowStuffWorks. Printed Date: Oct. 16, 2014; Posted Date: Unknown; <http://electronics.howstuffworks.com/gadgets/automotive/breathalyzer1.htm>.
Hankyung Auto News Article, Know-How Bank's Black Box for Cars "Multi-Black Box," Copyright 2005.
Guide to Bluetooth Security: Recommendations of the National Institute of Standards and Technology, National Institute of Standards and Technology, U.S. Dep't of Commerce, NIST Special Publication 800-121, Revision 1 (Jun. 2012).
ICOP Extreme Wireless Mic, Operation Supplement, Copyright 2008.
ICOP Model 20/20-W Specifications; Enhanced Digital In-Car Video and Audio recording Systems, date: Unknown.
ICOP Mobile DVRS; ICOP Model 20/20-W & ICOP 20/20 Vision, date: Unknown.
Bertomen, Lindsey J., PoliceOne.com News; "Product Review: ICOP Model 20/20-W," May 19, 2009.
ICOP Raytheon JPS communications, Raytheon Model 20/20-W, Raytheon 20/20 Vision Digital In-Car Video Systems, date: Unknown.
Overview of the IEEE 802.15.4 standards for Low rate Wireless Personal Area Networks, 2010 7th International Symposium on Wireless Communication Systems (ISWCS), Copyright 2010.
Lewis, S.R., Future System Specifications for Traffic Enforcement Equipment, S.R. 1 Source: IEE Colloquium (Digest), N 252, Publication Date: Nov. 18, 1996, pp. 8/1-8/2.
Kopin Corporation; Home Page; Printed Date: Oct. 16, 2014; Posted Date: Unknown; <http://www.kopin.com>.
Translation of Korean Patent No. 10-1050897, published Jul. 20, 2011.
Lilliput RV 18-50NP 5" Rear View Mirror TFT LCD Screen with Camera, Retrieved from the Internet: <URL: http://www.case-mod.com/lilliput-rv1850np-rear-view-mirror-tft-lcd-screen-with-camera-p-1271.html>, Mar. 4, 2005.
Motor Magazine Article, Recreating the Scene of an Accident, published 2005.
New Rearview-Mirror-Based Camera Display Takes the Guesswork Out of Backing Up Retrieved from the Internet: <URL: httb://news.thomasnet.com/fullstory/497750>, Press Release, Oct. 30, 2006.
SIIF Award for Multi Black Box, published Dec. 10, 2004.
Near Field Communication; Sony Corporation; pp. 1-7, Date: Unknown.
Oregon Scientific ATC Chameleon Dual Lens HD Action Camera, http://www.oregonscientificstore.com/Oregon-Scientific-ATC-Chameleon-Dual-Lens-HD-Action-Camera.data, Date Posted: Unknown; Date Printed: Oct. 13, 2014, pp. 1-4.
Asian Wolf High Quality Angel Eye Body Video Spy Camera Recorder System, http://www.asianwolf.com/covert-bodycam-hq-angeleye.html, Sep. 26, 2013, Date Posted: Unknown, pp. 1-3.
Amazon.com wearable camcorders, http://www.amazon.com/s/ref=nb_sb_ss_i_0_4?url=search-alias%3Dphoto&field-keywords=wearable+camcorder&x=0&y=0&sprefix=wear, Sep. 26, 2013, Date Posted: Unknown, pp. 1-4.
Notification of Transmittal of the International Search Report and the Written Opinion of the International Searching Authority, or the

(56) References Cited

OTHER PUBLICATIONS

Declaration dated Feb. 4, 2016; International Application No. PCT/US2015/056052; International Filing Date: Oct. 16, 2015; Applicant: Digital Ally, Inc.
http://www.k-h-b.com/board/board.php?board=products01&comand=body&no=1, Current State of Technology Held by the Company, Copyright 2005.
City of Pomona Request for Proposals for Mobile Video Recording System for Police Vehicles, dated prior to Apr. 4, 2013.
http://www.k-h-b.com/sub1_02.html, Copyright 2005.
Renstrom, Joell; "Tiny 3D Projectors Allow You to Transmit Holograms From a Cell Phone." Giant Freakin Robot. Printed Date: Oct. 16, 2014; Posted Date: Jun. 13, 2014; <http://www.giantfreakinrobot.com/sci/coming-3d-projectors-transmit-holograms-cell-phone.html>.
Request for Comment 1323 of the Internet Engineering Task Force, TCP Extensions for High Performance, Date: May 1992.
RevealMedia RS3-SX high definition video recorder, http://www.revealmedia.com/buy-t166/cameras/rs3-sx.aspx, Sep. 26, 2013, Date Posted: Unknown, pp. 1-2.
Scorpion Micro DV Video Audio Recorder, http://www.leacorp.com/scorpion-micro-dv-video-audio-recorder/, Sep. 26, 2013, Date Posted: Unknown, pp. 1-3.
"Stalker Press Room—Using In-Car Video, the Internet, and the Cloud to keep police officers safe is the subject of CopTrax live, free webinar." Stalker. Printed Date: Oct. 16, 2014; Posted Date: Jul. 31, 2014.
State of Utah Invitation to Bid State Cooperative Contract; Vendor: ICOP Digital, Inc., Contract No. MA503, Jul. 1, 2008.
Wasson, Brian; "Digital Eyewear for Law Enforcement." Printed Date: Oct. 16, 2014; Posted Date: Dec. 9, 2013; <http://www.wassom.com/digital-eyewear-for-law-enforcement.html>.
X26 Taser, Date Unknown.
Taser International; Taser X26 Specification Sheet, 2003.
Digital Ally First Vu Mountable Digital Camera Video Recorder, http://www.opticsplanet.com/digital-ally-first-vu-mountable-digital-camera-video-recorder.html?gclid=CIKohcX05rkCFSIo7AodU0IA0g&ef_id=UjCGEAAAAWGEjrQF:20130925155534:s, Sep. 25, 2013, Date Posted: Unknown, pp. 1-4.
Drift X170, http://driftinnovation.com/support/firmware-update/x170/, Sep. 26, 2013, Date Posted: Unknown, p. 1.
Dyna Spy Inc. hidden cameras, https://www.dynaspy.com/hidden-cameras/spy-cameras/body-worn-wearable-spy-cameras, Sep. 26, 2013, Date Posted: Unknown, pp. 1-3.
European Patent Application 15850436.6 Search Report dated May 4, 2018.
Petition for Post Grant Review No. PGR2018-00052, *Axon Enterprise, Inc.* v. *Digital Ally, Inc.*, filed Mar. 19, 2018.
MPEG-4 Coding of Moving Pictures and Audio ISO/IEC JTC1/SC29/WG11 N4668 dated Mar. 2002.
ecplaza HY-001HD law enforcement DVR, http://fireeye.en.ecplaza.net/law-enforcement-dvr--238185-1619696.html, Sep. 26, 2013, Date Posted: Unknown, pp. 1-3.
edesix VideoBadge, http://www.edesix.com/edesix-products, Sep. 26, 2013, Date Posted: Unknown, pp. 1-3.
GoPro Official Website: The World's Most Versatile Camera, http://gopro.com/products/?gclid=CKqHv9jT4rkCFWZk7AodyiAAaQ, Sep. 23, 2013, Date Posted: Unknown, pp. 4-9.
isaw Advance Hull HD EXtreme, www.isawcam.co.kr, Sep. 26, 2013, Date Posted: Unknown, p. 1.
Kustom Signals VieVu, http://www.kustomsignals.com/index.php/mvideo/vievu, Sep. 26, 2013, Date Posted: Unknown, pp. 1-4.
LEA-AID SCORPION Micro Recorder Patrol kit,http://www.leacorp.com/products/SCORPION-Micro-Recorder-Patrol-kit.html, Sep. 26, 2013, Date Posted: Unknown, pp. 1-2.
Looxcie Wearable & mountable streaming video cams, http://www.looxcie.com/overview?gclid=CPbDyv6piq8CFWeFQAodlhXC-w, Sep. 26, 2013, Date Posted: Unknown, pp. 1-4.
Midland XTC HD Video Camera, http://midlandradio.com/Company/xtc100-signup, Sep. 26, 2013, Date Posted: Unknown, pp. 1-3.

Panasonic Handheld AVCCAM HD Recorder/Player, http://www.panasonic.com/business/provideo/ag-hmr10.asp, Sep. 26, 2013, Date Posted: Unknown, pp. 1-2.
Notification of Transmittal of the International Search Report and the Written Opinion of the International Search Authority, or the Declaration dated Jan. 30, 2014, International Application No. PCT/US2013/062415; International Filing date Sep. 27, 2013, Applicant: Digital Ally, Inc.
Point of View Cameras Military & Police, http://pointofviewcameras.com/military-police, Sep. 26, 2013, Date Posted: Unknown, pp. 1-2.
POV.HD System Digital Video Camera, http://www.vio-pov.com/index.php, Sep. 26, 2013, Date Posted: Unknown, pp. 1-3.
SIV Security in Vehicle Driving Partner, http://www.siv.co.kr/, Sep. 26, 2013, Date Posted: Unknown, p. 1.
Spy Chest Mini Spy Camera / Self Contained Mini camcorder / Audio & Video Recorder, http://www.spytechs.com/spy_cameras/mini-spy-camera.htm, Sep. 26, 2013, Date Posted: Unknown, pp. 1-3.
Stalker VUE Law Enforcement Grade Body Worn Video Camera/Recorder, http://www.stalkerradar.com/law_vue.shtml, Sep. 26, 2013, Date Posted: Unknown, pp. 1-2.
SUV Cam, http://www.elmo.co.jp/suv-cam/en/product/index.html, Sep. 26, 2013, Date Posted: Unknown, p. 1.
TASER AXON Body on Officer Video/Police Body Camera, http://www.taser.com/products/on-officer-video/axon-body-on-officer-video, Sep. 23, 2013, Date Posted: Unknown, pp. 1-8.
TASER AXON Flex On-Officer Video/Police Video Camera, http://www.taser.com/products/on-officer-video/taser-axon, Sep. 26, 2013, Date Posted: Unknown, pp. 1-8.
Taser Cam Law Enforcement Audio/Video Recorder (gun mounted), http://www.taser.com/products/on-officer-video/taser-cam, Sep. 26, 2013, Date Posted: Unknown, pp. 1-3.
Tide Leader police body worn camera, http://tideleader.en.gongchang.com/product/14899076, Sep. 26, 2013, Date Posted: Unknown, pp. 1-3.
uCorder Pockito Wearable Mini Pocket Camcorder, http://www.ucorder.com/, Sep. 26, 2013, Date Posted: Unknown, p. 1.
Veho MUVI HD, http://veho-uk.fastnet.co.uk/main/shop.aspx?category=CAMMUVIHD, Sep. 26, 2013, Date Posted: Unknown, pp. 1-5.
Veho MUVI portable wireless speaker with dock, http://veho-uk.fastnet.co.uk/main/shop.aspx?category=camcorder, Sep. 26, 2013, Date Posted: Unknown, p. 1.
Vidmic Officer Worn Video & Radio Accessories, http://www.vidmic.com/, Sep. 26, 2013, Date Posted: Unknown, p. 1.
VIEVU Products, http://www.vievu.com/vievu-products/vievu-squared/, Sep. 25, 2013, Date Posted: Unknown, pp. 1-2.
WatchGuard CopVu Wearable Video Camera System, http://watchguardvideo.com/copvu/overview, Sep. 26, 2013, Date Posted: Unknown, pp. 1-2.
Witness Cam headset, http://www.secgru.com/DVR-Witness-Cam-Headset-Video-Recorder-SG-DVR-1-COP.html, Sep. 26, 2013, Date Posted: Unknown, pp. 1-2.
WolfCom 3rd Eye, X1 A/V Recorder for Police and Military, http://wolfcomusa.com/Products.html, Sep. 26, 2013, Date Posted: Unknown, pp. 1-3.
Notification of Transmittal of the International Search Report and the Written Opinion of the International Search Authority, or the Declaration dated Jan. 14, 2016, International Application No. PCT/US2015/056039; International Filing date Oct. 16, 2015, Applicant: Digital Ally, Inc.
U.S. Appl. No. 13/959,142 Final Office Action dated Jul. 20, 2016.
U.S. Appl. No. 13/959,142 Office Action dated Nov. 3, 2015.
*Digital Ally, Inc.* vs. *Taser International, Inc.*, Case No. 2:16-cv-020232 (CJM/TJ); US D. Kan, Complaint for Patent Infringement, Jan. 14, 2016.
*Digital Ally, Inc.* vs. *Enforcement video LLC d/b/a Watchguard Video.*, Case No. 2:16-cv-02349 (CJM/TJ); US D. Kan, Complaint for Patent Infringement, May 27, 2016.
International Association of Chiefs of Police Digital Video System Minimum Specifications; Nov. 21, 2008.
Petition for *Inter Partes* Review No. 2017-00375, *Taser International, Inc.* v. *Digital Ally, Inc.*, filed Dec. 1, 2013.

(56) References Cited

OTHER PUBLICATIONS

Petition for *Inter Partes* Review No. 2017-00376, *Taser International, Inc.* v. *Digital Ally, Inc.*, filed Dec. 1, 2013.
Petition for *Inter Partes* Review No. 2017-00515, *Taser International, Inc.* v. *Digital Ally Inc.*, filed Jan. 11, 2017.
Petition for *Inter Partes* Review No. 2017-00775, *Taser International, Inc.* v. *Digital Ally Inc.*, filed Jan. 25, 2017.
PCT Patent Application PCT/US16/34345 International Search Report and Written Opinion dated Dec. 29, 2016.
State of Utah Invitation to Bid State Cooperative Contract; Vendor: Kustom Signals Inc., Contract No. MA1991, Apr. 25, 2008.
PCT Patent Application PCT/US17/16383 International Search Report and Written Opinion dated May 4, 2017.
Invalidity Chart for International Publication No. WO2014/000161 Oct. 31, 2017.
Final Written Decision for *Inter Partes* Review No. 2017-00375, *Axon Enterprise Inc.* v. *Digital Ally, Inc.*, issued Jun. 1, 2018.
Decision Denying Institution of Post Grant Review for Post Grant Review No. PGR2018-00052, *Axon Enterprise, Inc.* v. *Digital Ally, Inc.*, issued Oct. 1, 2018.

\* cited by examiner

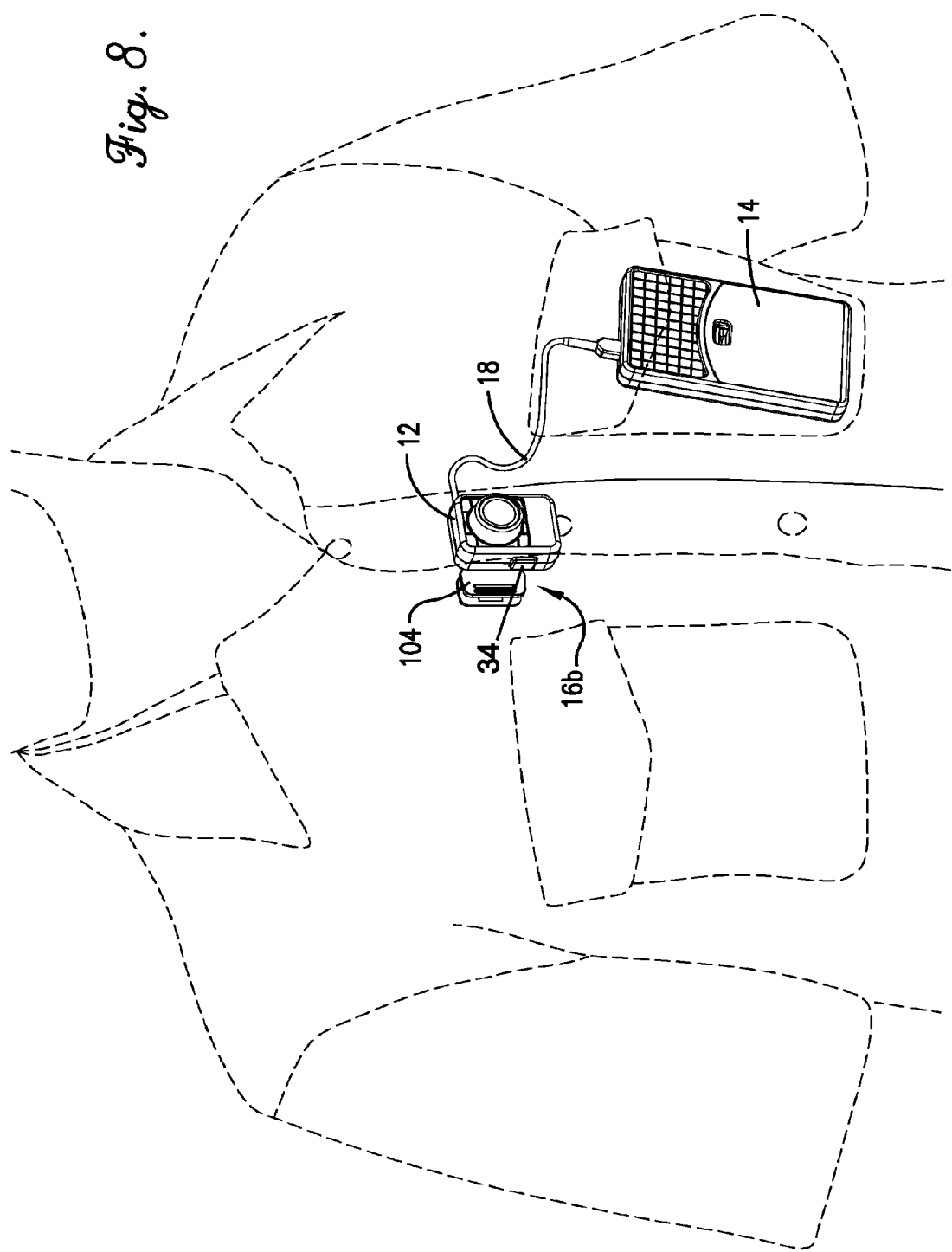

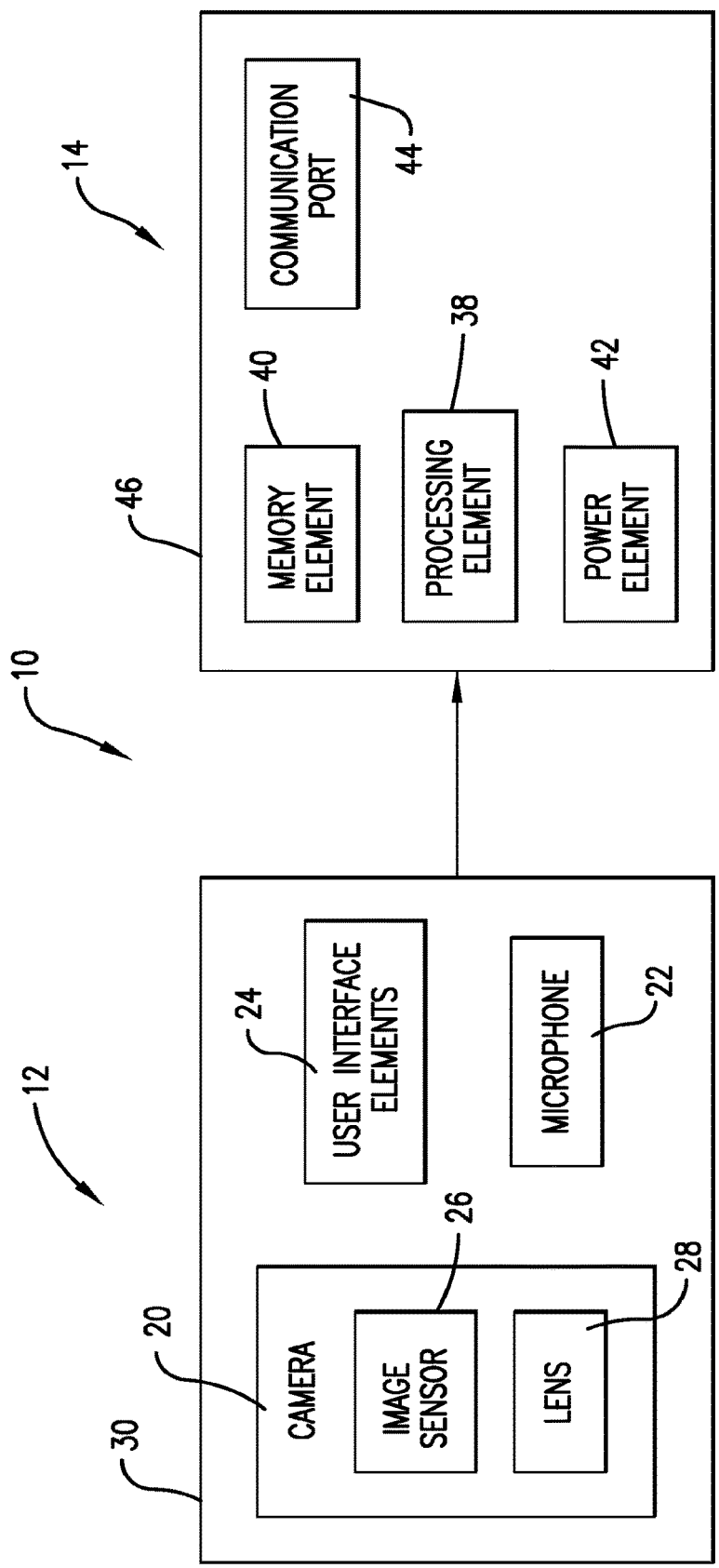

PORTABLE VIDEO AND IMAGING SYSTEM

RELATED APPLICATIONS

This non-provisional patent application is a continuation application and claims priority benefit, with regard to all common subject matter, of commonly assigned U.S. patent application Ser. No. 14/991,607, filed Jan. 8, 2016 and entitled "PORTABLE VIDEO AND IMAGING SYSTEM," and now issued as U.S. Pat. No. 9,712,730 on Jul. 18, 2017 ("the '730 Patent"). The '730 Patent is a continuation application and claims priority benefit, with regard to all common subject matter, of commonly assigned U.S. patent application Ser. No. 14/575,433, filed Dec. 18, 2014, and entitled "PORTABLE VIDEO AND IMAGING SYSTEM," and now issued as U.S. Pat. No. 9,237,262 on Jan. 12, 2016 ("the '262 Patent"). The '262 Patent is a continuation application and claims priority benefit, with regard to all common subject matter, of commonly assigned U.S. patent application Ser. No. 14/040,329, filed Sep. 27, 2013, and entitled "PORTABLE VIDEO AND IMAGING SYSTEM," and now issued as U.S. Pat. No. 9,019,431 on Apr. 28, 2015 ("the '431 Patent"). The '431 Patent is a non-provisional application that claims priority benefit, with regard to all common subject matter, of earlier-filed U.S. Provisional Patent Application Ser. No. 61/707,348, filed Sep. 28, 2012, and entitled "PORTABLE VIDEO AND IMAGING SYSTEM," and U.S. Provisional Patent Application No. 61/707,326, filed Sep. 28, 2012, and entitled "MOBILE VIDEO AND IMAGING SYSTEM." The identified earlier-filed patents and provisional patent applications are hereby incorporated by reference in their entirety into the present application.

BACKGROUND

1. Field

Embodiments of the invention relate to a portable system for recording videos and still images. More particularly, embodiments of the invention relate to a portable digital video recording system sized to be worn on a user's body and configured to be mounted in a plurality of locations on the user's body, including a clothing article worn by the user, on a device carried by the user, such as a firearm, or in a vehicle. In other embodiments, the portable video and imaging system may be mounted in or on a vehicle.

2. Related Art

Although recording devices for recording video and still images are generally known, the recording device is commonly housed in a single housing that stores a camera, a memory element, and a processing element. The single housing is not mountable to a user's body. Moreover, when the recording device is used for law enforcement where captured video is frequently used as evidence, the loss of captured video due to damage or removal of the single housing of the recording device is problematic.

SUMMARY

Embodiments of the invention solve the above-mentioned problems by providing a computer program, method, apparatus, and system for mounting a small, portable digital video recording system to a user's body, an article of clothing, a device carried by the user, or in a vehicle.

An embodiment of the video recording system broadly comprises a camera component for capturing video of an event and a recording component comprising a processor and a memory associated with the camera component for storing the captured video. The camera component includes a camera housed within a housing having a size configured to mount on a user's body. The housing includes at least one input to instruct recording by the camera. The video recording system further includes a mounting assembly for mounting the camera to the user's body. In embodiments, the mounting assembly is a button-mount assembly including a slotted plate presenting a slot for receipt of a button through the slot.

Another embodiment of the video recording system broadly comprises the camera component and recording component described above. The mounting assembly, however, is a clip, such as an alligator clip, configured for grasping a clothing article of the user. In yet another embodiment, the mounting assembly is a hook-and-loop fastener. An even further embodiment comprises a mounting assembly for mounting the camera and recording components to a vehicle and broadly comprising a cradle for holding the recording component and a mounting arm for holding the camera component, wherein the mounting arm is secured to the cradle. Other embodiments comprise mounting assemblies for securing at least one or both of the camera and recording components to a belt worn by the user, around a head of a user or hat worn by the user, and on a firearm carried by the user.

In embodiments of the invention, the camera component is in a first housing, and the recording component is in a second housing. The camera and recording components are communicatively coupled together, and the housings for the two components are physically separate housings.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 8 is an environmental view of a second mounting assembly of embodiments of the invention secured to the user's body;

FIG. 30 is a schematic of the camera component and recording component of embodiments of the invention.

Figure 1:
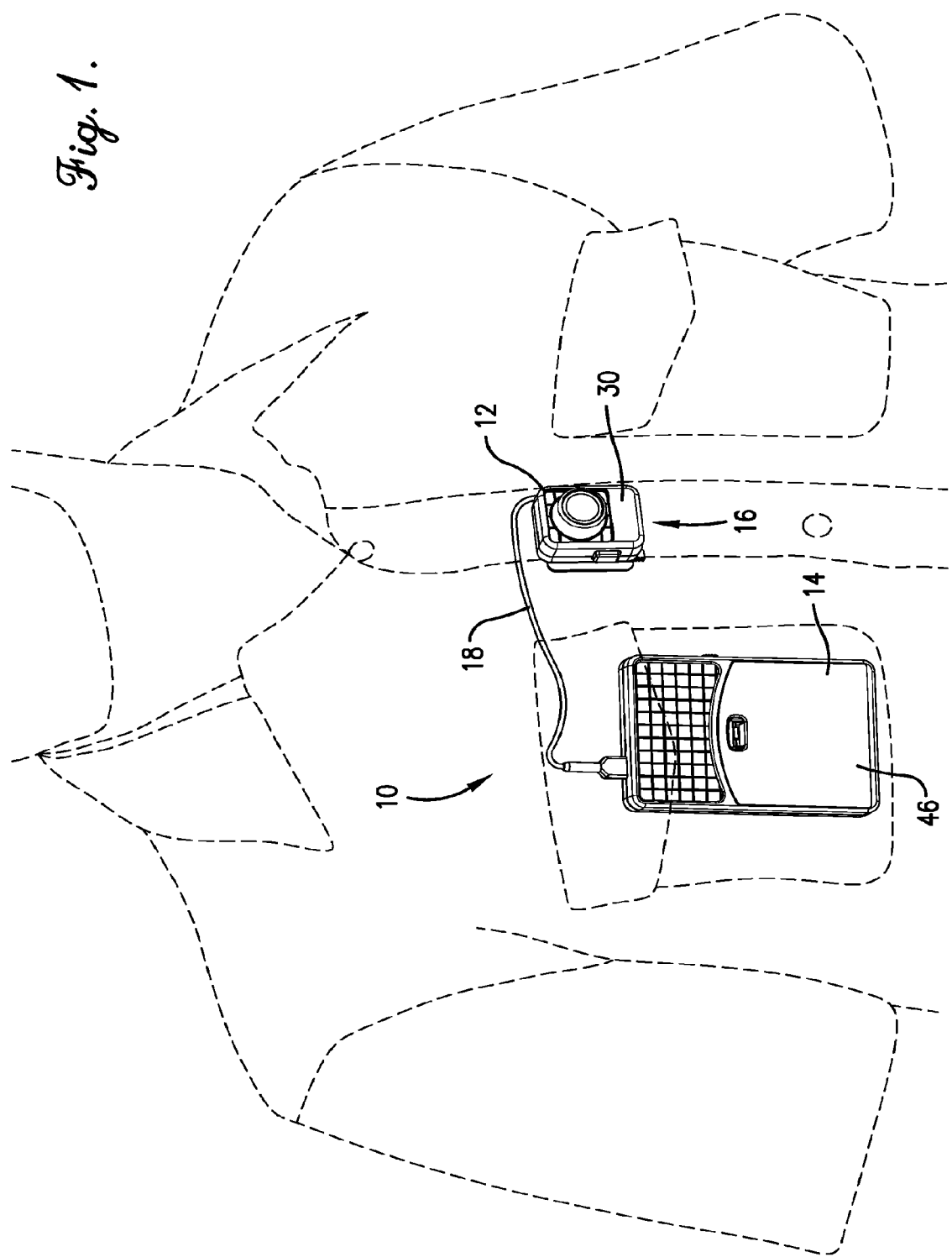
FIG. 1 is an environmental view of a portable video and imaging system of embodiments of the invention and mounted on a user's body.

The drawing figures do not limit the current invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Features and components of embodiments of the invention may be, in some respects, similar to features and components described in U.S. application Ser. No. 14/040,006, filed Sep. 27, 2013, claiming priority to U.S. Provisional Patent Application No. 61/707,326, filed Sep. 28, 2012, and entitled "MOBILE VIDEO AND IMAGING SYSTEM" (identified above in the Related Applications section), and owned by the assignee of the present application. The referenced non-provisional application filed concurrently herewith and claiming priority to the '326 Provisional Application is incorporated by reference herein in its entirety. Additionally, the following patent and patent application, both of which are owned by the assignee of the present application, are incorporated by reference herein in their entirety: U.S. Pat. No. 8,520,069, issued Aug. 27, 2013, and entitled "VEHICLE-MOUNTED VIDEO SYSTEM WITH DISTRIBUTED PROCESSING; and U.S. patent application Ser. No. 13/967,151, filed Aug. 14, 2013, entitled "COMPUTER PROGRAM, METHOD, AND SYSTEM FOR MANAGING MULTIPLE DATA RECORDING DEVICES."

Turning to the figures, and particularly FIG. 1, an embodiment of the present invention is a digital video recording system 10 broadly comprising a camera component 12, a recording component 14, and a mounting assembly 16. The digital video recording system 10 is portable and relatively small, such that the system can be easily carried by a user on the user's body, a clothing article of the user, a device carried by the user, such as a firearm, or in a vehicle. The system 10 is unobtrusive and lightweight so as to not interfere with routine activity by the user. Moreover, the mounting assembly 16 of the system 10 for mounting on the user's body or clothing article of the user provides a secure mount that will not become dislodged, even under active movement by the user.

In embodiments of the invention, the digital video recording system 10 is advantageous for use by law enforcement personnel during an event, such as approaching a suspect or performing an arrest. Law enforcement personnel routinely encounter physically demanding activities and other rigors.

The mounting assembly 16 of embodiments of the invention provides secure mounting configurations that can be used by the law enforcement personnel during these demanding activities and based on their preference of location on the personnel's body or clothing. Although embodiments of the invention are adapted for law enforcement personnel, it should be appreciated that the digital video recording system 10 can be used by any user desiring to record events occurring in front of and around the user or a vehicle (in embodiments where the recorder is mounted in the vehicle).

In embodiments of the invention, the camera component 12 is physically separated from the recording component 14, such that each component 12,14 is housed in its own distinct housing, as described in more detail below. The camera and recording components 12,14 are, in embodiments, communicatively coupled via cabling 18, such as a pigtail cable having a mini-USB for interconnecting the two components. In alternative embodiments, the camera and recording components 12,14 are wirelessly communicatively coupled, and wireless signals comprising instructions or data may be transmitted via communications networks such as the Internet, Wi-Fi links, radio-frequency ("RF") links, Bluetooth technology, infrared (IR), Near Field Communication (NFC) technology, or long and short wave radio.

The camera component 12 is configured to capture video or still images (individually or collectively, "video") and to transmit the captured video to the recording component 14 for storage on a memory of the recording component, as further discussed below. By separating the housing for the camera component 12 from the housing for the recording component 14, the housing for the camera component can be very small, light, and easily mounted in multiple locations. Additionally, should the camera component 12 be dislodged or removed during physical activity, such as an altercation between law enforcement personnel and a suspect, the recording component 14 that stores the captured video is not removed or damaged. For example, should the suspect remove the camera component 12 from the law enforcement personnel's body, the recording component 14 is not also removed (or at least not easily removed). In situations where the captured video is legally important to law enforcement personnel (such as evidence to establish a particular event occurred), insuring that the captured video is not stolen or destroyed is advantageous.

The camera component 12 generally includes image and audio capture components and circuitry, such as a camera 20, a microphone 22, and user interface elements 24 for providing input or instructions to the camera. The camera 20 comprises an image sensor 26 and a lens 28 and is configured to operate with relatively little ambient light. The image sensor 26 is a high-sensitivity image sensor operable to capture video in HD and in low light at a minimum lux of at least 0.0687 lux. Suitable image sensors of embodiments of the invention are sold by Omnivision™, Product No. OV10630-CBGA. In embodiments of the invention, a suitable lens 28 of the camera 20 is sold by Sunex Digital Imaging Optics™, Product No. DSL235, and a suitable lens holder is also sold by Sunex, Part No. CMT233. The lens 28 has the following field of view: horizontal, 97 degrees; vertical, 70 degrees; and diagonal, 136 degrees. In embodiments of the invention, the camera 20 is operable to record in 720p video with an H.264 codec, a 1280×720 resolution, and at 30 frames per second. Moreover, encoded, captured video may be viewed on standardized video-viewing software. It should be appreciated that other image sensors and lenses could be employed in embodiments of the invention.

In alternative embodiments of the invention, the camera component 12 may also include a memory element (not shown) for temporarily storing captured video prior to transmission to the recording component 14. In such an embodiment, storage of the captured video on the memory element of the camera component 12 is cached for short-term storage, such as if the captured video cannot be transmitted to the recording component 14.

As noted above, the camera component 12 includes a first housing 30. A width of the housing 30 is approximately 0.25 inch to approximately 5 inches, approximately 0.5 inch to approximately 4 inches, approximately 0.75 inch to approximately 3 inches, or approximately 1.125 inch. A height of the housing 30 is approximately 0.5 inch to approximately 5 inches, approximately 0.75 inch to approximately 4 inches, approximately 1.25 inches to approximately 3 inches, or approximately 1.5 inches. A depth of the housing (excluding the lens and lens holder that extend from a main body of the housing 30) is approximately 0.15 inch to approximately 1 inch, approximately 0.25 inch to approximately 0.9, inch, approximately 0.35 inch to approximately 0.75 inch, or approximately 0.5 inch. Additionally, the camera component 12 weighs less than or equal to 5 ounces, less than or equal to 3 ounces, less than or equal to 1 ounce, or approximately 0.8 ounce.

The housing 30 is made of ABS or other lightweight, durable material and is covered with neoprene to be soft to the touch and water resistant. The housing 30 includes the user interface elements 24 positioned thereon, which in embodiments of the invention comprise at least a first input 32 and a second input 34. The first input 32 is a power on/off switch that can be actuated to a power on position where the system 10 is, in various embodiments of the invention, either (1) in a standby mode, such that the system is ready to begin capturing video upon instruction by the user; (2) in a capture mode, such that the system begins continuously capturing video upon actuation of the power on/off switch; or (3) in a trigger event mode, such that the system begins capturing video upon a triggering event, as described in more detail below. The first input 32 is a slide switch that can be moved from an actuated position to a non-actuated position. When in an actuated position, the first input 32 slides to reveal a green-colored portion of the housing to indicate the actuated position to the user. The first input 32 is located on a side of the housing 30.

The second input 34 controls active record and marking of an event. In particular, in embodiments of the invention where the first input 32 places the camera component 12 in a standby mode, the user can quickly instruct recording by depressing or otherwise actuating the second input 34. During recording of an event, the user can also mark the captured video. "Marking" of the captured video provides an indication of a point in time, i.e., the time when the user depresses the second input 34. The user can then quickly move to marked locations in the captured video upon viewing of the video using standardized video viewing software. Marking of the captured video allows the user to identify the point in time at which a particular event in the captured video occurs. Actuation of the second input 34 thus serves as both an instruction to begin recording and to mark the captured video to identify a time or location in the captured video corresponding to actuation of the second input 34.

The microphone 22 is mounted in the housing 30 and is operable to capture audio of an event. The microphone 22 comprises at least one opening 36 on a front of the housing 30. In embodiments of the invention, the housing 30 includes a third input (not shown) for stopping or otherwise muting the recording of audio (while still recording video). This third input may be desired by some law enforcement personnel located in a jurisdiction that does not allow audio recordings of an event.

In embodiments of the invention, the housing 30 does not include any LEDs or other indication that the camera component 12 is recording so that persons encountered by the user of the system 10 do not realize they are being recorded. However, in alternative embodiments, the housing 30 may include one or more LEDs or other indicators to identify recording by the system 10, and such indicators may or may not be viewable by persons other than the user of the system 10.

Figure 2:
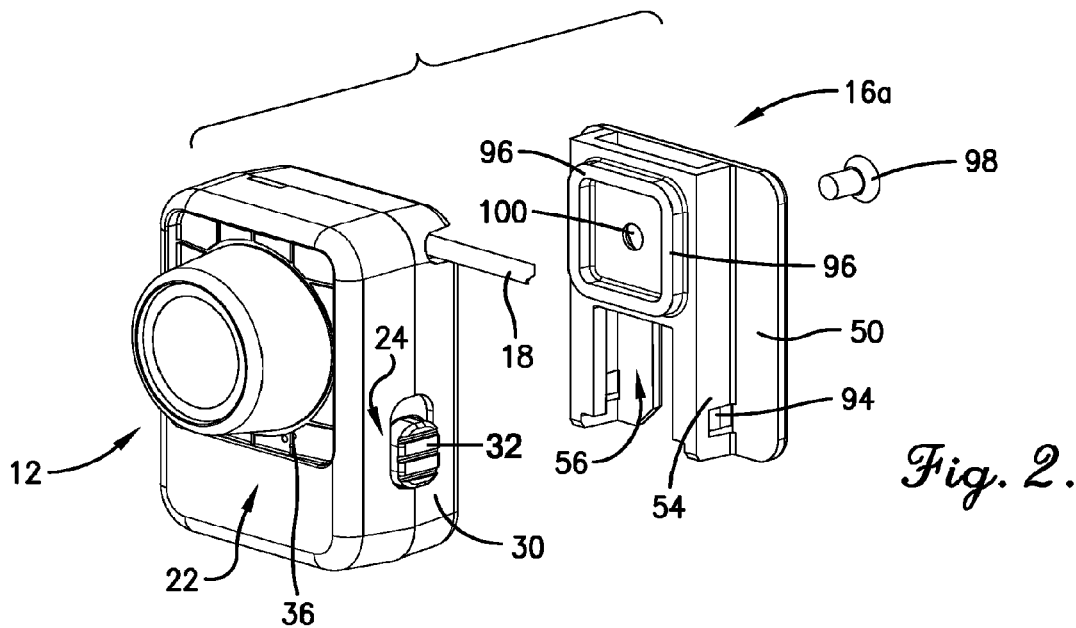
FIG. 2 is a front exploded view of the camera component mounted to a first mounting assembly that is a button-mount assembly.
Figure 3:
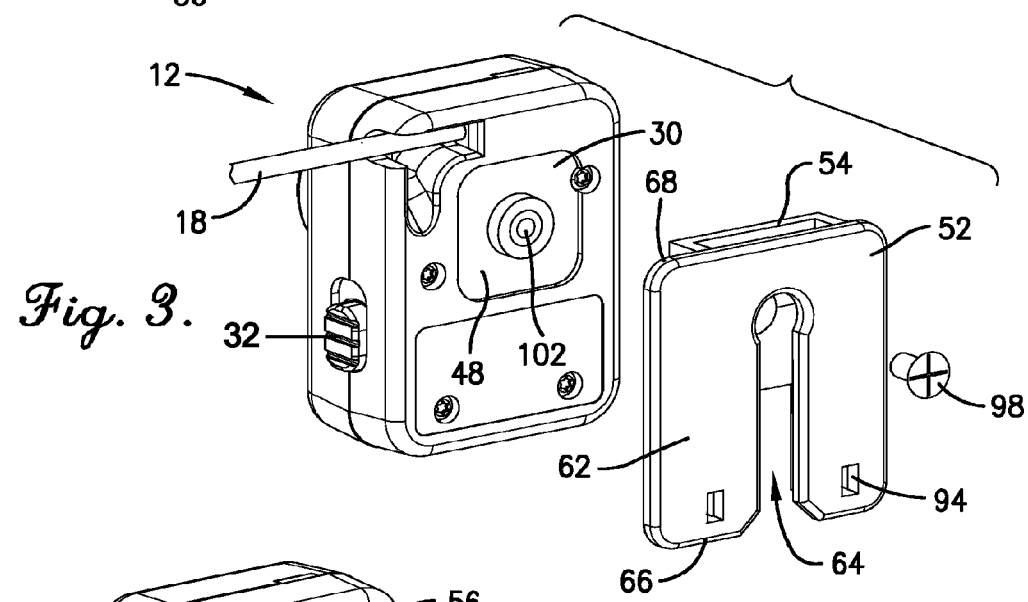
FIG. 3 is a rear exploded view of the button-mount assembly of FIG. 2.
Figure 4:
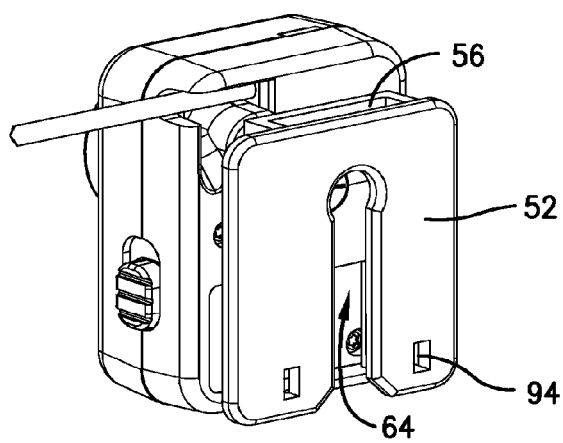
FIG. 4 is a rear perspective view of the button-mount assembly of FIG. 2.

As shown in FIGS. 1 and 2, the cabling 18 for communicatively connecting the housing 30 to the recording component 14 extends from a rear of the housing 30. Various lengths of cabling 18 may be provided depending on how and where the user mounts the camera component 12 and the recording component 14.

Referring to FIG. 30, the recording component 14 generally includes a processing element 38, a memory element 40, a power element 42, and at least one communication port 44. As noted above, the recording component is housed in a second housing 46 that is physically separate from the first housing 30 of the camera component.

The processing element 38 may include processors, microprocessors, microcontrollers, digital signal processors (DSPs), field-programmable gate arrays (FPGAs), analog and/or digital application-specific integrated circuits (ASICs), and the like, or combinations thereof. The processing element 38 may generally execute, process, or run instructions, code, software, firmware, programs, applications, apps, processes, services, daemons, or the like, or may step through states of a finite-state machine.

The memory element 40 may include data storage components such as read-only memory (ROM), programmable ROM, erasable programmable ROM, random-access memory (RAM), hard disks, floppy disks, optical disks, flash memory, thumb drives, universal serial bus (USB) drives, and the like, or combinations thereof. In embodiments, the memory element 40 is a solid state element with no moving parts. The memory element 40 may include, or may constitute, a non-transitory "computer-readable storage medium." The memory element 40 may store the instructions, code, software, firmware, programs, applications, apps, services, daemons, or the like that are executed by the processing element 40. In particular embodiments, the memory element 40 stores the video captured by the camera component 12 and transmitted to the recording component 14. The memory element 40 may also store settings, data, documents, sound files, photographs, movies, images, databases, and the like. The processing element 38 may be in communication with the memory element 40 through address busses, data busses, control lines, and the like.

The power element 42 is a battery or other component for providing power to the system 10. The power element 42 is housed in the second housing 46 and is, in embodiment, rechargeable. In embodiments, the batter can be easily removed and replaced in the field, which extends the operating time and use for the system 10.

The at least one communication port 44 generally allows the recording component 14 to communicate with the camera component 12 or a server or other computing device (not shown) through a communications network (not shown). Thus, the communication port 44 may be in communication with the processing element 38 and the memory element 40.

The communication port 44 may be wired and may include connectors or couplers to receive metal conductor cables or connectors or optical fiber cables. In embodiments, a first communication port 44a is a mini-USB port (also known as a micro-USB port) for receipt of the mini-USB adaptor from the cabling 18 for transmission of captured data from the camera component 12 and to the recording component 14. In embodiments, the port 44a is recessed within the second housing 46 to allow for quick break-away of the cabling 18 from the recording component 14. Such may be desirable if the user is in a situation where the camera component 12 is being removed or dislodged from the user's body or clothing, as the recording component having the stored video is not also removed with the camera component 12. The at least one communication port 44 may also comprise a second communication port 44b for receipt of a mini-USB for transmission of recorded video to a computing device.

In embodiments, the at least one communication port 44 may also or alternatively be wireless and may include antennas, signal or data receiving circuits, and signal or data transmitting circuits. The communication port 44 may transmit and receive radio frequency (RF) signals and/or data and may operate utilizing communication standards such as cellular 2G, 3G, or 4G, IEEE 802.11 or 802.16 standards, Bluetooth™, or combinations thereof.

The second housing 46 for the recording component 14 is generally rectangularly-shaped, although it could be other shapes. In embodiments, the second housing is sized and configured to be positioned in the user's front breast pocket or front pants pocket, as illustrated in FIG. 1, when the camera component 12 is mounted to a front of the user's shirt. A width of the second housing 46 is approximately 1 inch to approximately 5 inches, approximately 1.5 inches to approximately 4 inches, approximately 2 inches to approximately 3 inches, or approximately 2.625 inches. A height or length of the housing 46 is approximately 1 inch to approximately 8 inches, approximately 2 inches to approximately 7 inches, approximately 3 inches to approximately 6 inches, or approximately 4 inches. A depth of the housing 46 is approximately 0.15 inch to approximately 1 inch, approximately 0.25 inch to approximately 0.9 inch, approximately 0.35 inch to approximately 0.75 inch, or approximately 0.625 inch. Additionally, the recording component 14 weighs less than or equal to 7 ounces, less than or equal to 5 ounces, less than or equal to 4 ounces, or approximately 3.1 ounces. Similar to the first housing 30, the second housing 46 is made of ABS or other lightweight, durable material and is covered with neoprene to be soft to the touch and water resistant. The communication ports 44a,44b are positioned on the housing 46.

In embodiments of the invention, the digital video recording system 10 may be provided with "pre-event" recording program and method in which the system 10 records constantly in a loop of a selected duration of time, such as thirty seconds or sixty seconds. Upon a triggering event occurring, as described below, the camera component 12 transmits to the recording component 14 the captured video for the selected duration of time, e.g., the thirty-second segment of captured video occurring prior to the triggering event. Examples of a triggering event may include, for example, the user actuating the second input 34 to instruct recording by the camera component 12, turning on a vehicle's siren and/or signal lights, an accelerometer measurement outside a pre-established norm, a position of the vehicle and/or officer as measured by a GPS, a vehicle crash event or the police vehicle attaining a threshold speed (e.g., 80 m.p.h.), etc. In embodiments, the recording component 14 may receive a signal from, for example, the vehicle indicative of a triggering event. In response to receipt of the signal, or based on a type of triggering event as evidenced by the signal, the recording component 14 may begin recording.

The digital video recording system 10 may also generate time stamps for the captured video. In such an embodiment, the system 10 includes a clock (not shown) for noting a time when a particular item of video is captured. The recording component 14 then identifies each frame based on the time generated by the clock. Each frame of the captured video has a unique time stamp. An officer or other user reviewing the captured video will then know when a particular image or item of video obtained from the recording component 14. In even further embodiments, the time stamp may include a date (if not already included in the time stamp), any triggering event (as described herein), etc.

Various embodiments of the digital video recording system 10 may include any one or more of the following features: required entry of a password or code prior to accessing and changing operational settings; required use of a key to unlock a lockable housing for removal of any removable memory components; incorporation of electronic watermarks into the recorded video images to prevent tampering or alteration; wireless downloading of the contents of the memory element 40 to a laptop or other computer; streaming the live video from the camera component 12 and possibly other inputs and/or outputs via a high-speed wireless data network; encoding of multiple video streams from multiple cameras simultaneously; a remote control device for allowing a user to remotely control the operation of the system 10; and a temperature sensor and temperature indicator operable to detect and warn the user if the system 10 is at risk of malfunction or damage due to an ambient temperature that is too high or too low for proper operation, such as may easily occur in a vehicle on a very hot or very cold day. The housings 30,46 may be vented to dissipate heat and may include other passive or active features to moderate temperature, especially in relatively extreme environments. Embodiments of the invention may also include a computer program for viewing the captured video on a mobile communications device, such as via an app, at a website, or using viewing software.

In yet further alternative embodiments, the system 10 may also include an integrated GPS receiver (not shown) connected to a GPS antenna (not shown). Utilizing the information provided by these components, the system 10 may mark recorded video with real-time position data of where the captured video was taken. The system 10 may include a "dead reckoning" function that works with GPS to allow for operation in shielded locations, such as underground garages. Some embodiments may communicate directly with the GPS receiver so that GPS coordinates stored in video event metadata may be automatically updated upon the automatic or manual marking or flagging of a video event.

In addition or as an alternative to the GPS, embodiments of the invention may include an RFID or another type of location or identification feature or sensor (not shown) that informs the system 10 of the location of the camera component 12 and/or the recording component 14. In embodiments, the RFID is mounted within the first housing 30 of the camera component to identify the user using the system 10 and potentially a location of the camera component 12.

Turning now to FIGS. 2-29, various mounting assemblies 16 are illustrated. As discussed above, the camera component 12 and/or both the camera and recording components 12,14 are configured to be mounted to the user's body or clothing, a device carried by the user, or a vehicle. In embodiments of the invention, the mounting assemblies 16 are interchangeable, so that the user may mount the camera component 12 and/or the recording component 14 in various positions and locations based on the desired preferences of the user. As illustrated in FIG. 1, to facilitate ease of manufacture, mounting, purchase, and use of the camera and recording components 12,14, the camera component 12 includes a generally square-shaped recessed seat 48 located on a rear of the first housing 30 for securing or otherwise coupling the user-preferred mounting assembly to the camera component 12. The recessed seat is sized and configured to couple to each of the mounting assemblies 16, as described below, so as to present a system 10 with the interchangeable mounting assemblies.

In a first mounting assembly 16a illustrated in FIGS. 2-7, the mounting assembly is a button-mount assembly for mounting the camera component 12 to a button 50 located on the user's shirt. The mounting assembly 16a broadly comprises a slotted plate 52, a mounting bracket 54 forwardly extending from the slotted plate 52, a longitudinal track 56 formed between the slotted plate 52 and the mounting bracket 54, a retention clip 58 held in the longitudinal track 56 and for preventing the mounting assembly 16a from becoming dislodged from the user's clothing, and a coupler 60 for securing the mounting assembly 16a to the camera component 12.

The slotted plate 52 comprises a generally rectangular-shaped, flat body 62 having a slot 64 formed therethrough. The slot 64 is formed in the body 62 of the plate 52 along a general longitudinal axis of the plate 52. The longitudinal axis generally coincides with the height of the camera component 12 once the mounting assembly 16a is coupled with the camera component 12. Alternatively, the slot 64 could be formed along a transverse, diagonal, or other axis of the plate 52. The slot 64 is open at a first, lower end 66 of the slotted plate 52 and closed at a second, general upper end 68 of the slotted plate 52. In use, the slot 64 is placed behind the button 50 on the user's shirt and guided downwards over yarn or other material that secures the button 50 to the user's clothing. Once the slot 64 is positioned over the yarn retaining the button 50, the button extends from a general front 70 of the slotted plate 52 and the yarn or other material securing the button to the user's clothing is held within the slot 64 of the slotted plate 52. A rear 72 of the slotted plate 52 is then adjacent the user's shirt.

The mounting bracket 54 is integrally formed on or coupled to the front 70 of the slotted plate 52, such that the mounting bracket 54 at least partially overlays and forwardly extends from the front 70 of the plate 52. The bracket 54 thus presents a raised area comprising the longitudinal track 56 between the front 70 of the plate 52 and a front 74 of the bracket 54. The track 56 extends along at least a portion of the slot 64. When the button-mount assembly 16a is mounted to the button 50 of the user's clothing, the button 50 is held in the longitudinal track 56 between the front 70 of the slotted plate 52 and the mounting bracket 54.

Figure 5:
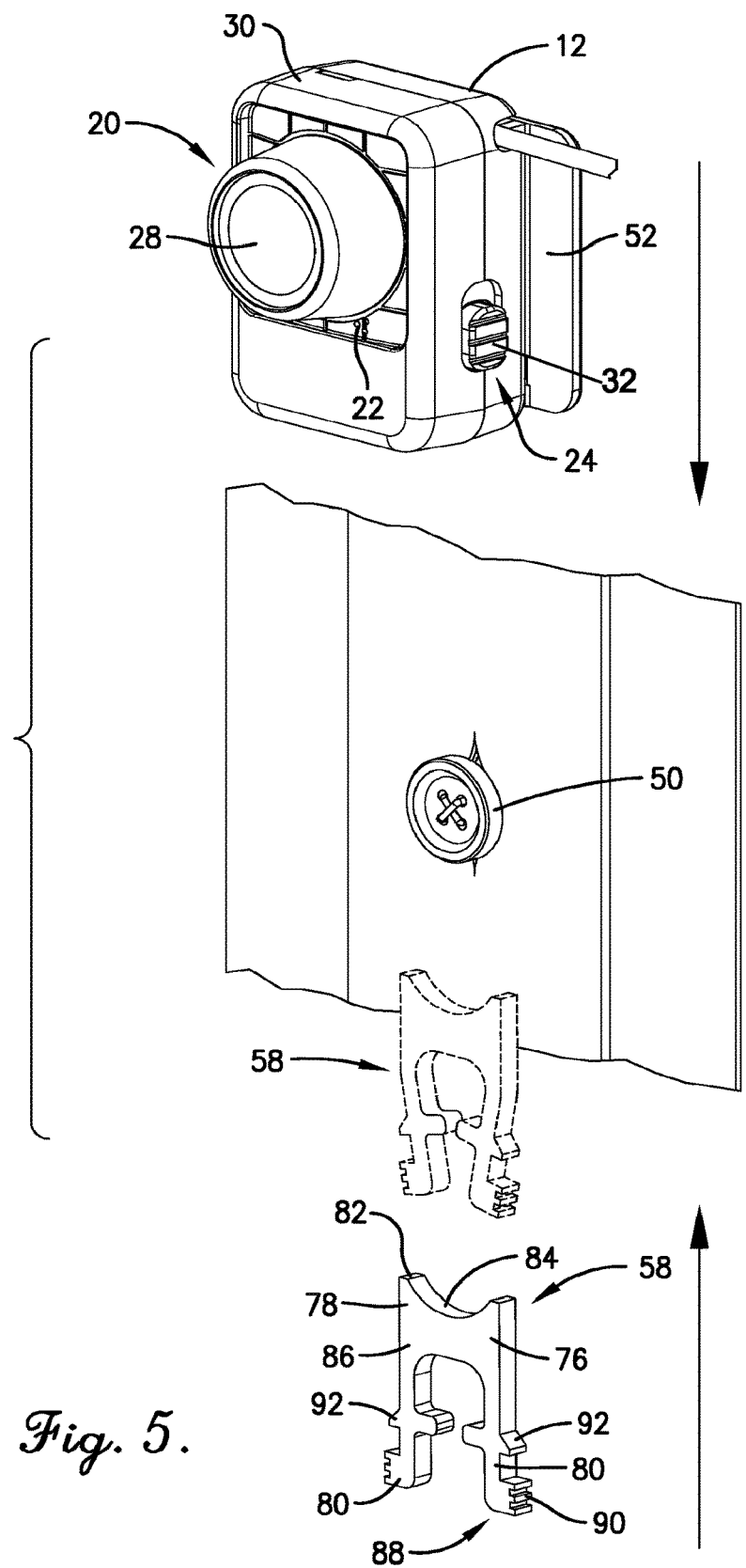
FIG. 5 is an exploded view of the button-mount assembly and particularly illustrating mounting of the assembly on the user's body.
Figure 7:
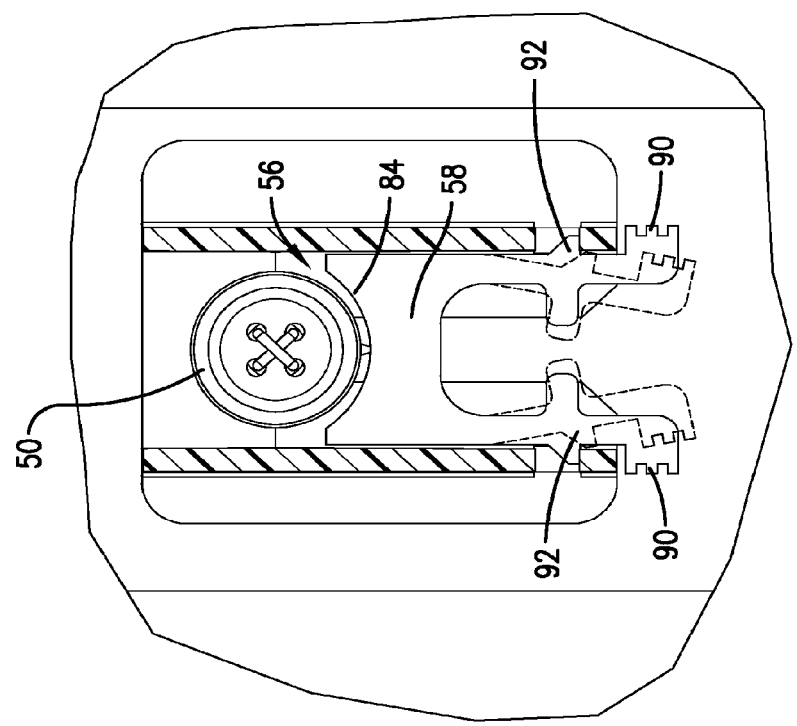
FIG. 7 is a horizontal cross-sectional view taken through line 7-7 of FIG. 7 and illustrating a retention clip of the button-mount assembly.
Figure 6:
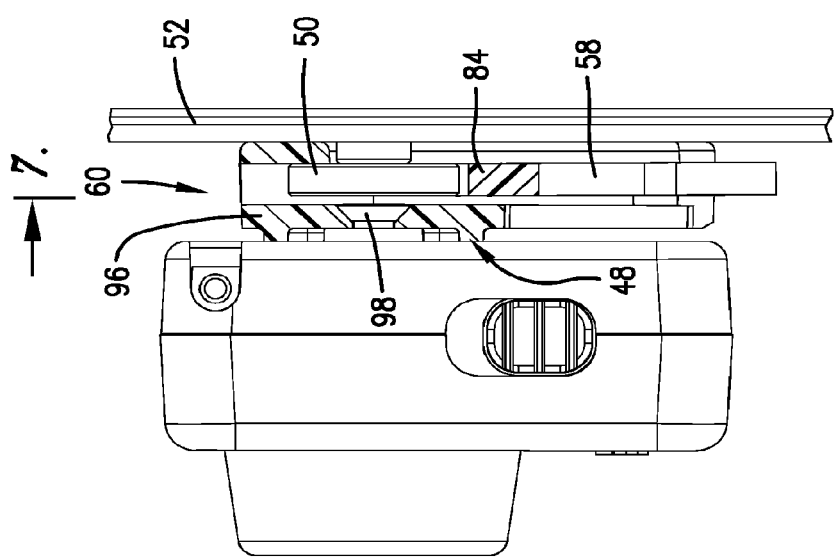
FIG. 6 is a fragment, right side elevation view of the camera component and button-mount assembly and particularly illustrating the assembly mounted to the button of the user's shirt.

To insure that the button-mount assembly 16a does not become dislodged from the user's clothing, the assembly 16a further includes the retention clip 58, as illustrated in FIGS. 5-7. The retention clip 58 is mechanically secured within the longitudinal track 56, as further described below. The clip 58 comprises a generally flat body 76 having a transverse shoulder 78 and two longitudinally-extending legs 80. A top 82 of the shoulder 78 is provided with an inverted saddle 84 that is arcuate in shape to interfit and mate with an arcuate shape of the button 50. The legs 80 extend downwards from a bottom 86 of the shoulder 78, and a lower end 88 of each leg 80 is toothed 90 to facilitate grasping of the legs by the user.

To position the retention clip 58 within the longitudinal track 56, the user slides the clip upwards, shoulder first, so that the inverted saddle 84 seats with the button. Each leg 80 is provided with an outwardly extending, chamfered tab 92. The longitudinal track 56 has receiving openings 94 formed at a general lower end of the track 56. To secure the clip 58 within the track 56, the legs 80 are transversely resilient so that they can be flexed inwards towards each other. The user places a finger at the toothed portion 90 of each leg 80 and slightly pushes inwards while sliding the retention clip 58 upwards into the track 56. Once seated within the track 56, the user releases the inwards pressure on the legs 80, which returns the legs 80 to a neutral state and locates the outwardly extending tabs 92 on the legs within the receiving openings 94 on the track 56. To remove the camera component 12 from the user's clothing, the user reverses the above process by pressing inwardly on the toothed portion 90 of the legs to remove the tabs 92 from the openings 94 in the track 56 and allow the retention clip 58 to be slid out of the track 56. The user can then remove the slotted plate 52 from the button 50.

The coupler 60 of the button-mount assembly 16 comprises a ledge 96 integral or coupled with the mounting bracket 54 and sized and configured to interfit with the recessed seat 48 on the rear of the housing 30, and a screw 98 for securing the combined mounting bracket 54 and slotted plate 52 to the camera component 12. As illustrated in FIG. 2, the ledge 96 is positioned on the front 74 of the mounting bracket 54. The ledge 96 is generally square-shaped to match the generally square-shaped recessed seat 48 on the camera component housing 30. As can be appreciated, the perimeter of the ledge 96 may be slightly less than an inner perimeter of the recessed seat 48 to insure the ledge 96 fits or seats within the recessed seat 48.

As illustrated in FIG. 2, a small opening or hole 100 is formed in the front 74 of the mounting bracket 54 to receive the screw 98 therethrough. The screw 98 is received within a similarly-sized threaded opening 102 on the rear of the camera component housing 30. The user screws the combined slotted plate 52 and mounting bracket 54 to the rear of the camera component housing 30 by placing the screw 98 through the hole 100 in the bracket 54 and threading in the opening 102.

Figure 9:
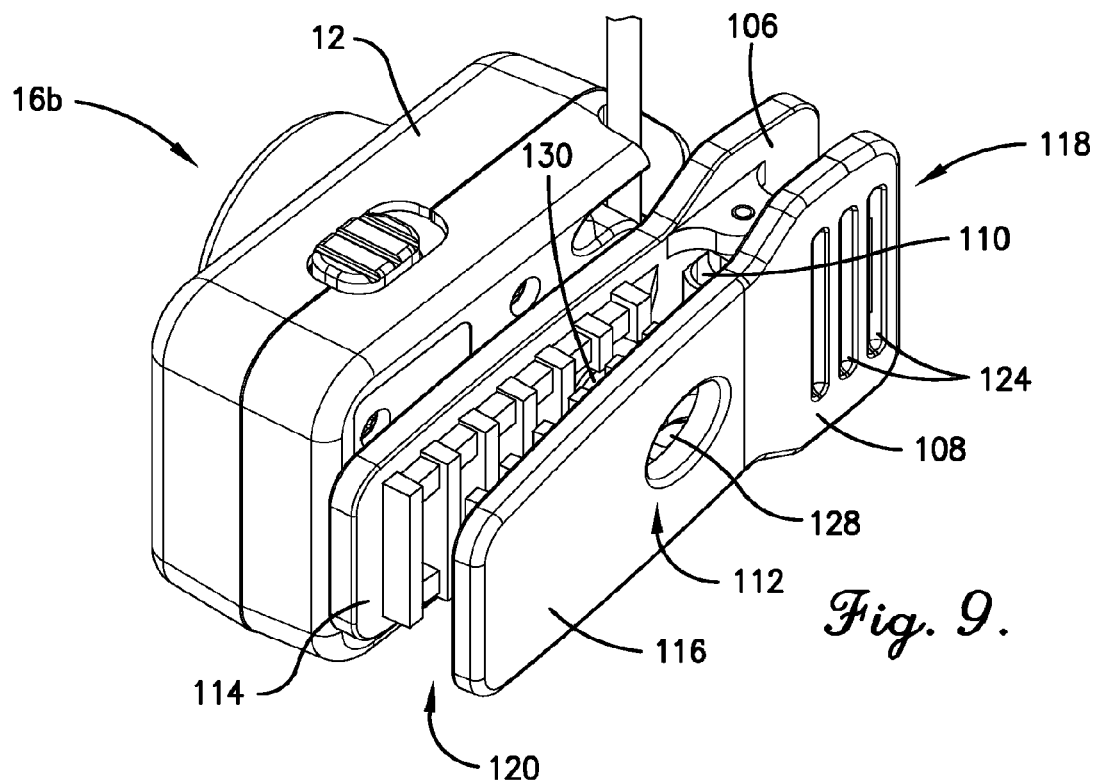
FIG. 9 is a rear perspective view of the second mounting assembly and particularly illustrating a clip.

Referring now to FIGS. 8-9, a second mounting assembly 16b is illustrated and comprises a clip 104 configured for grasping a clothing article of the user. In embodiments, the clip 104 is an alligator clip and comprises a first, bottom plate 106, a second, top plate 108, a spring 110 interposed between the plates 106,108 to provide resilient grasping tension, and a coupler 112. Referring to FIG. 9, each plate 106,108 has an inner face 114, an outer face 116, a grasping end 118 that is grasped by the user when positioning the clip 104, and an open end 120 that opens up to receive the user's clothing or other structure to which the clip 104 is being attached.

The plates 106,108 are pivotably secured together at their respective grasping ends 118. The spring 110 is interposed between the plates 106,108 to provide a pivot point about which the plates are pivoted. The spring 110 is a flat, U-shaped spring, and opposing ends 122 of the spring 110 are secured to the inner face 114 of each plate 106,108. In the spring's rest state, the opposing ends 122 of the spring 110 extend outwardly. Upon the user grasping each of the gasping ends 118 of the plates 106,108, the opposing ends 122 of the spring 110 are pushed together to pivot the grasping ends 118 of each plate 106,108 towards each other and, in response, pivot the open ends 120 of each plate 106,108 away from each other.

In a plan view, each plate 106,108 has the same general shape. However, when viewing the clip 104 from the sides, it can be seen that the first, bottom plate 106 is generally flat, except that the grasping end 118 angles slightly downwards. The second, top plate 108 is also generally flat, except that the grasping end 118 angles slightly upwards. The angle for the top plate 108 is greater than the angle for the lower plate 106. This provides better positioning for the user to apply force at the grasping end 118 when the user is applying pressure to the top plate 108 to open the plates 106,108. As is illustrated, the outer face 1106 of each plate 106,108 at the grasping end 118 includes a plurality of depressions 124 to assist in tactile gripping of the plates during positioning of the clip 104.

Figure 11:
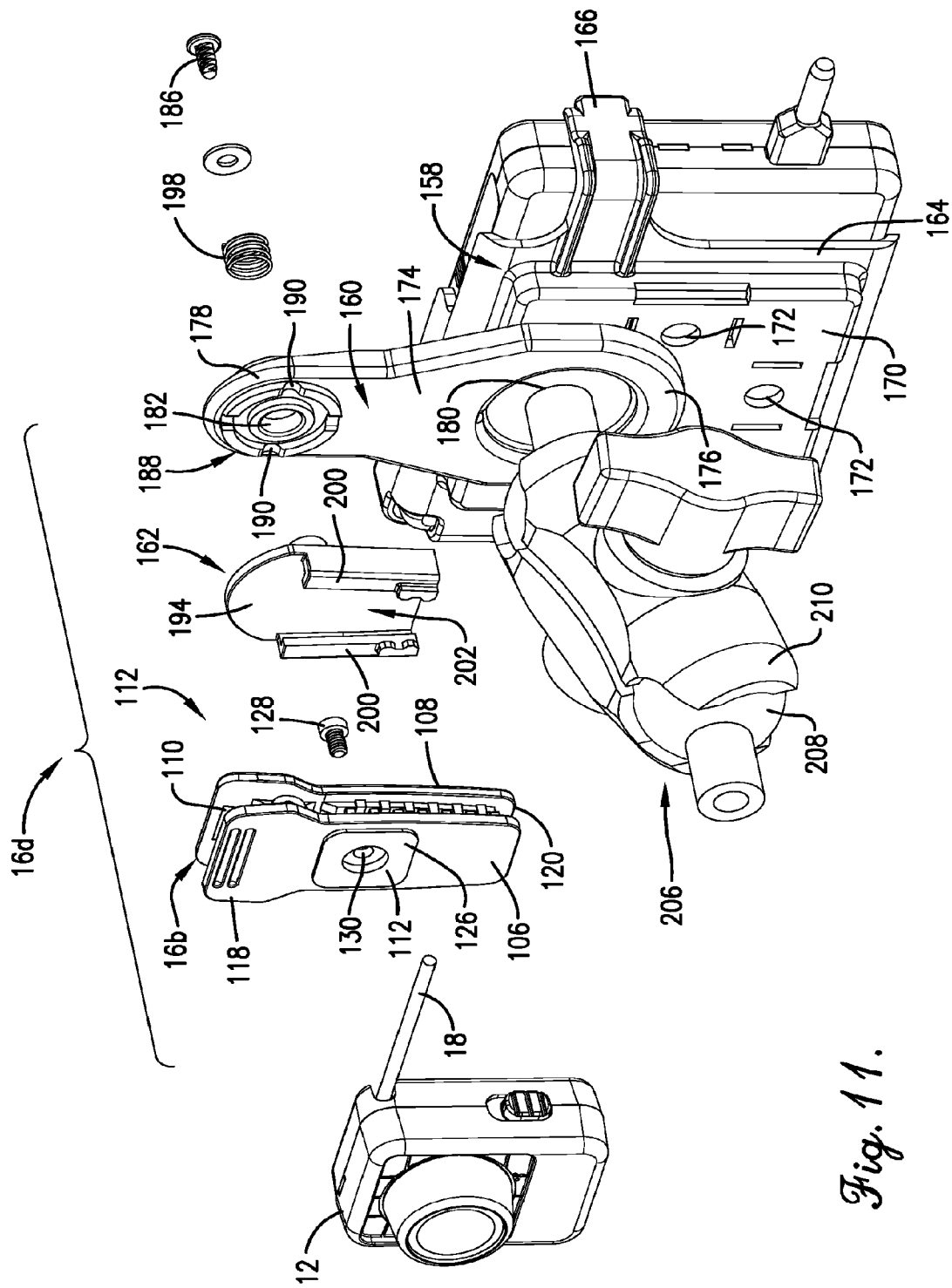
FIG. 11 is a front exploded view of a fourth mounting assembly for securing the camera component and the recording component together in a vehicle and particularly illustrating the camera component mounted to the clip of the second mounting assembly.

Referring to FIG. 11 (which illustrates both a second mounting assembly 16b and the second mounting assembly 16b working in conjunction with a fourth mounting assembly 16d), the coupler 112 comprises a raised seat 126 and a screw 128. The raised seat 126 is integral with or secured to the outer face 116 of the bottom plate 106. Similar to the first mounting assembly 16a and the ledge 96 of the mounting bracket 54, a perimeter and a shape of the raised seat 126 is approximately the same as the perimeter and shape of the recessed seat 48 on the rear of the camera component housing 30. The raised seat 126 of the clip 104 then interfits with the recessed seat 48 of the housing 30. As can be appreciated, the perimeter of the raised seat 126 may be slightly less than an inner perimeter of the recessed seat 48 to insure the raised seat 126 fits or seats within the recessed seat 48.

The screw 128 is threaded through an opening 130 in the bottom plate 106 to secure the clip 104 to the camera component 12. The clip 104 can be mounted to the camera component 12 in a plurality of directions by rotating the orientation of the clip 104 relative to the housing 30.

Figure 10:
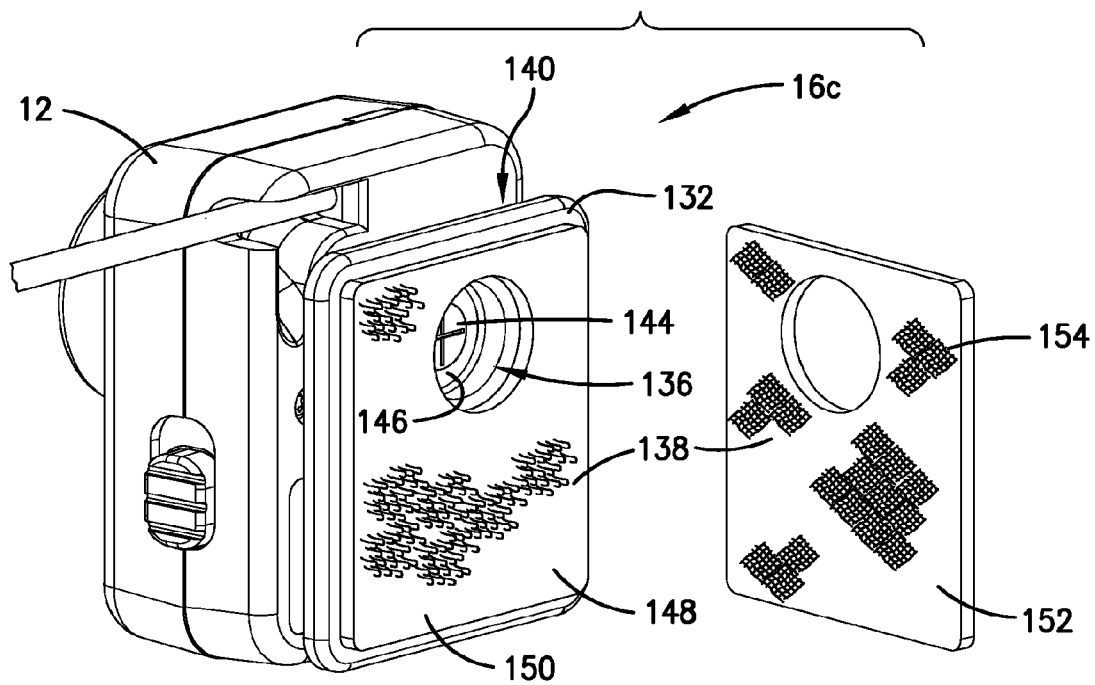
FIG. 10 is an exploded view of a third mounting assembly that is a hook-and-loop fastener.

A third mounting assembly 16c is illustrated in FIG. 10 and is a hook-and-loop mount (also known as Velcro™). The hook-and-loop mounting assembly 16c broadly comprises a plate 132, a mounting bracket (not shown) substantially similar to the mounting bracket 54, a coupler 136 for coupling the plate 132 and mounting bracket to the camera component housing 30, and adhesively-securable hook-and-loop material 138. The plate 132 and mounting bracket are, in embodiments, integral, although the mounting bracket may be, in alternative embodiments, a separate component coupled with the plate 132. The plate 132 is generally rectangular-shaped. The mounting bracket is integrally formed on or coupled to a front 140 of the plate 132, such that the mounting bracket at least partially overlays and forwardly extends from the front 140 of the plate 132.

The coupler 136 comprises a ledge (not shown but substantially similar to the ledge 96 of mounting bracket 54) integral or coupled with the mounting bracket and sized and configured to interfit with the recessed seat 48 on the rear of the camera component housing 30, and a screw 144 for securing the combined mounting bracket and plate 132 to the camera component 12. Similar to ledge 96, the ledge of mounting assembly 16c is positioned on a front of the mounting bracket. The ledge is generally square-shaped to match the generally square-shaped recessed seat 48 on the camera component housing 30. As can be appreciated, the perimeter of the ledge may be slightly less than an inner perimeter of the recessed seat 48 to insure the ledge fits or seats within the recessed seat 48. To secure the mounting assembly 16c to the camera component housing 30, the screw 144 is threaded through an opening 146 in the mounting bracket.

The hook-and-loop material 138 comprises a first substrate 148 having a hooked material 150 on one face and adhesive (not shown) on another face, and a second substrate 152 having a loop material 154 on one face and adhesive (not shown) on another face. One of the first and second substrates 148,152 is adhesively secured to a rear of the plate 132, and the other of the substrates 148,152 is adhesively secured to a structure to which the system 10 is desired to be mounted. The user can then mate the hook-and-loop materials 150,154 to secure the system 10 to the desired structure.

A small opening or hole is formed through the plate 132 and mounting bracket to receive the screw 144 therethrough. The user then screws the combined plate and mounting bracket to the rear of the camera component housing 30 by threading the screw 144 through the opening.

A fourth mounting assembly 16d is illustrated in FIGS. 11-17 and is a cradle mount for mounting both the camera component 12 and the recording component 14, The mounting assembly 16d broadly comprises a cradle 158, a mounting arm 160, a first clip mounting bracket 162, and the clip 104 of the mounting assembly 16b. The cradle 158 is sized and configured to releasably and easily mount the recording component 14. The cradle 158 includes a main body 164 with a plurality of flexible arms 166 extending therefrom to secure the recording component 14 in the cradle. The plurality of arms 166 extend from the body 164 at generally right angles to the body. An outermost end 168 of each arm 166 curves slightly inwardly to hold the recording component 14 within the cradle 158. In particular, the recording component 14 is snap-fit within the cradle 158, such that the flexible arms 166 can be moved slightly outwardly to place the recording component 14 against the cradle's body 164. The outermost end 168 of each arm 166 then wraps around the recording component 14 to snap or frictionally secure the recording component 14 within the cradle 158.

A portion 170 of the body 164 of the cradle 158 extends rearwardly, as illustrated in FIG. 11, to receive the mounting arm 160, and is provided with a plurality of openings 172. The mounting arm 160 can then be secured to the body 164 of the cradle 158 through any one of the openings 172, as discussed in more detail below, depending on a desired positioning of the mounting assembly 16d. It should be appreciated that the mounting arm 160 may also be secured to the body 164 of the cradle 158 in a plurality of angles or orientations. For example, as illustrated in FIG. 11, a longitudinal axis of the mounting arm 160 (i.e., the axis extending from the narrow to the wide ends of the arm) is generally perpendicular to a transverse axis of the cradle 158. However, the mounting arm 160 could be positioned so that its longitudinal axis is generally parallel to the transverse axis of the cradle 164 by rotating the arm approximately 90 degrees to the left or to the right from the orientation shown in FIG. 11. Thus, the mounting arm 160 can be positioned at any desired angle relative to the cradle 158 and further can be positioned at different locations on the cradle 158 by securing a screw through one of the plurality of openings 172 in the cradle 158, as further described below.

The mounting arm 160 comprises a tapered body 174 having a wide end 176 and a narrow end 178. The wide end 176 is provided with a first hole or opening 180 through the body 174 to receive a first screw (not shown) for securing the mounting arm 160 to the body 164 of the cradle 158. In particular, the first screw (not shown) is located through the first opening 180 in the wide end 176 of the mounting arm 160 and through one of the plurality of openings 172 in the body 164 of the cradle 158 to secure the mounting arm 160 to the cradle 158. The narrow end 178 is provided with the second hole or opening 182 through the body 174 to receive a second screw 186 for securing the first clip mounting bracket 162 to the body 174 of the mounting arm 160. The narrow end 178 of the mounting arm 160 is provided with a raised, generally circular positioning mount 188 for positioning the attached camera component 12 in a plurality of orientations. The circular positioning mount 188 extends generally rearwardly from the body 174 of the mounting arm 160 (i.e., the direction opposite the front of the recording component 14 when mounted in the cradle 158) and includes a plurality of depressions 190. In particular, four depressions 190 are provided, one at each of the general north, south, east, and west locations on the circular positioning mount 188. However, it should be appreciated that more or less depressions may be provided and may also be positioned at different locations on the circular positioning mount 188. The location of each depression 190 corresponds to a preferred angle or orientation of a position of the camera component 12 as described below.

The first clip mounting bracket 162 is sized and configured to removably retain the camera component 12 and includes a front face 192 (facing towards the mounting arm 160 when the first clip mounting bracket 162 is secured to the mounting arm 160) and a rear face 194 (facing towards the rear of the camera component 12 when the camera component 12 is retained in the first clip mounting bracket 162). The front face 192 of the first clip mounting bracket 162 is provided with a plurality of detents 196 configured to be received in the plurality of depressions 190 on the circular positioning mount 188 of the mounting arm 160. In embodiments, the mounting bracket 162 includes four detents 196, one of each provided at the general north, south, east, and west locations to coincide with the location of the depressions 190 on the circular positioning mount 188. However, it should be appreciated that more or less detents 196 may be provided and may also be positioned at different locations on the first clip mounting bracket 162.

Figure 12:
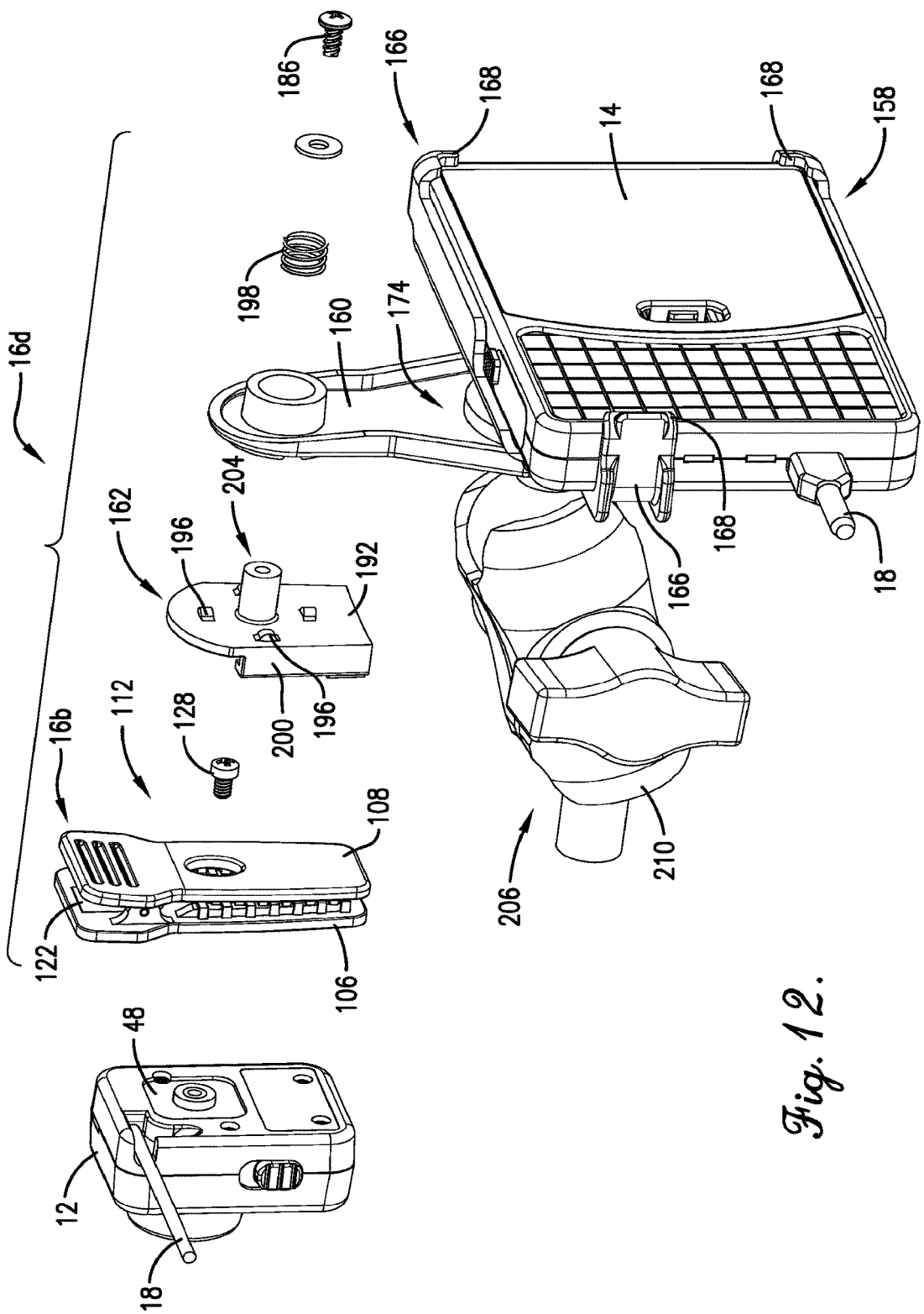
FIG. 12 is a rear exploded view of the fourth mounting assembly of FIG. 11.

The first clip mounting bracket 162 is pivotably secured to the narrow end 178 of the mounting arm 160, as illustrated in FIGS. 11 and 12. The second screw 186 is located through the second hole or opening 182 in the narrow end 178 of the mounting arm 160 and secured to the mounting bracket 162 to couple the components together. To enable pivoting of the clip mounting bracket 162 relative to the mounting arm 160, a spring 198 surrounds the second screw 186. The spring 198 enables the clip mounting bracket 162 to be pulled by the user away from the mounting arm 160, such that the detents 196 on the bracket 162 clear the circular positioning mount 188. That is, in a secure position, the detents 196 are held in or otherwise interfit with the depressions 190, as illustrated in FIGS. 11 and 12. During pivoting of the mounting bracket 162, the bracket is pulled laterally from the mounting arm 160 so that the detents 196 slide above the circular positioning mount 188 during rotation of the bracket 162 relative to the mounting arm 160. Upon rotating the mounting bracket 162 to the desired location, the spring 198 locates the mounting bracket 162 back towards the mounting arm 160, such that the detents 196 again interfit with the depressions 190 and secure the mounting bracket 162 in position.

Figure 13:
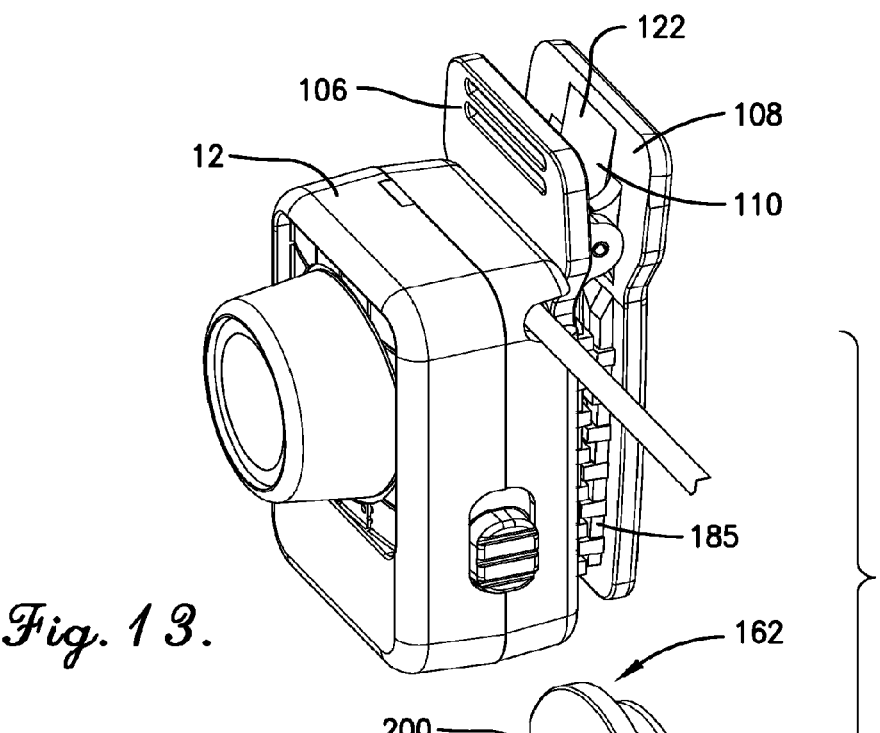
FIG. 13 is an exploded view of the clip and a mounting bracket of the fourth mounting assembly and particularly illustrating mounting of the camera component.
Figure 14:
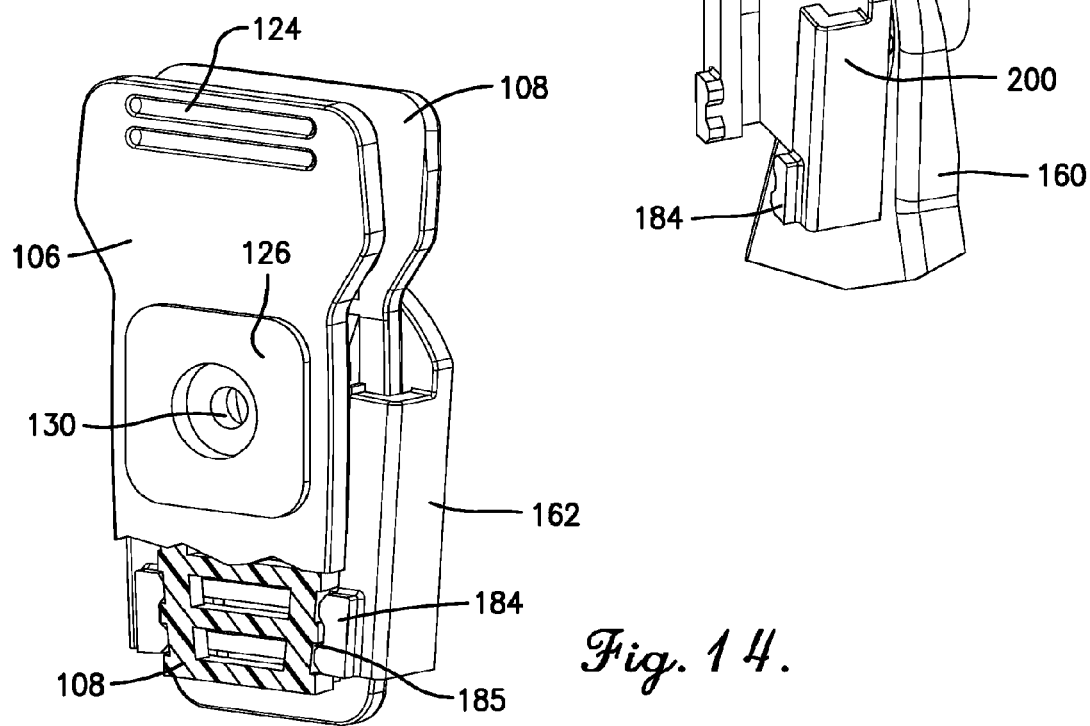
FIG. 14 is a fragment front perspective view of the clip mounted in the mounting bracket and particularly illustrating structure that frictionally secures the clip in place.
Figure 15:
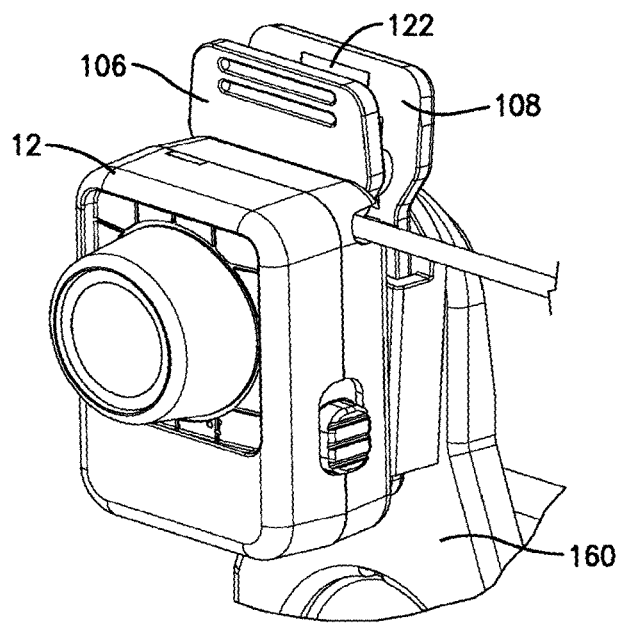
FIG. 15 is a front perspective view of the camera component mounted to the clip, and the clip mounted on a mounting arm of the fourth mounting assembly.
Figure 16:
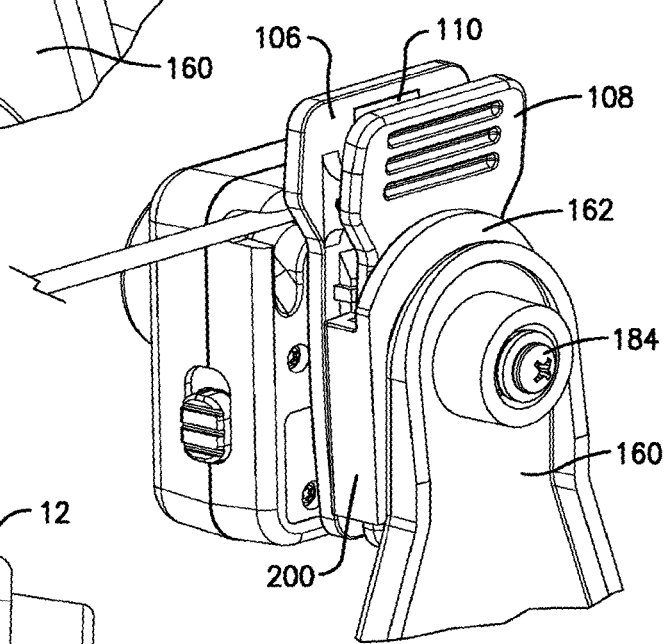
FIG. 16 is a rear perspective view of the fourth mounted assembly of FIG. 15.
Figure 17:
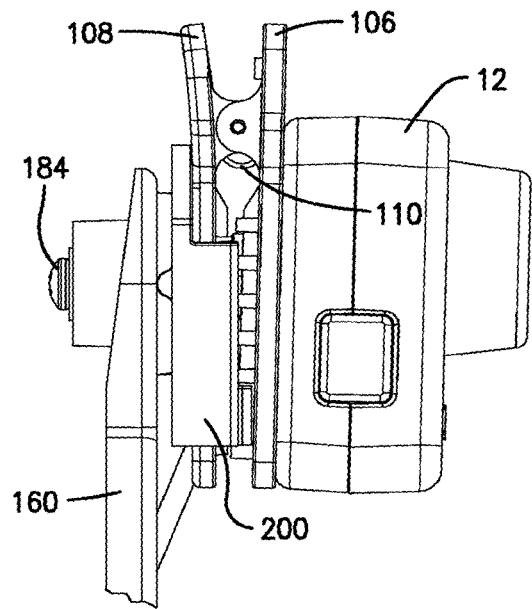
FIG. 17 is a left side elevation view of the assembly of FIG. 15.

The rear face 192 of the first clip mounting bracket 162 is provided with a pair of walls 200 that create a track or slot 202 within which the clip 104 of the second mounting assembly 16b can be frictionally secured. As illustrated in FIG. 13, the walls 200 are positioned on the edge of the rear face 192 of the clip mounting bracket 162. A width of the track 202 created between the walls 200 is approximately the same size as (or slightly larger) than a width of the first and second plates 106,108 of the clip 104. The width of the plates 106,108 increases from the open end 120 to the grasping end 118 of the clip 104, and similarly, the with of the track 202 in the mounting bracket 162 widens from a lower to an upper end of the track. The camera component 12 can then be secured to the clip 104, as described above, and the clip 104 can be secured within the track 202 on the clip mounting bracket 162. To assist with securing the clip 104 in the clip mounting bracket 162, the walls 200 of the track are each provided with a locking tab 184 at the lower end and as best illustrated in FIGS. 13 and 14. The locking tab interfits with ridges 185 on the plates 106,108 of the clip 104.

The fourth mounting assembly 16d is configured to be mounted to a vehicle, such as the inside of a vehicle near a dashboard, an upper middle console, a windshield, or any other location desired by the user. To mount the mounting assembly 16d to the vehicle, the mounting assembly further includes a coupler 204, such as a RAM mount sold by RAM Mounts®. The coupler 204 includes a ball joint 206 operable to be secured to the mounting arm 160 and cradle 158 via a screw (not shown) threaded through the first hole 180 of the mounting arm 160. Extending from the ball joint 206 is a ball 208 operable to be received in a socket 210 of a separate mounting installation 212, such as the RAM mount. The separate mounting installation 212 may be a suction-cup unit that includes the socket 210 for receipt of the ball 208 of the ball joint 206. The suction-cup unit can then be mounted to the windshield or dashboard of the vehicle. Other methods and configurations of mounting the fourth mounting assembly 16d within the vehicle may be employed.

Figure 18:
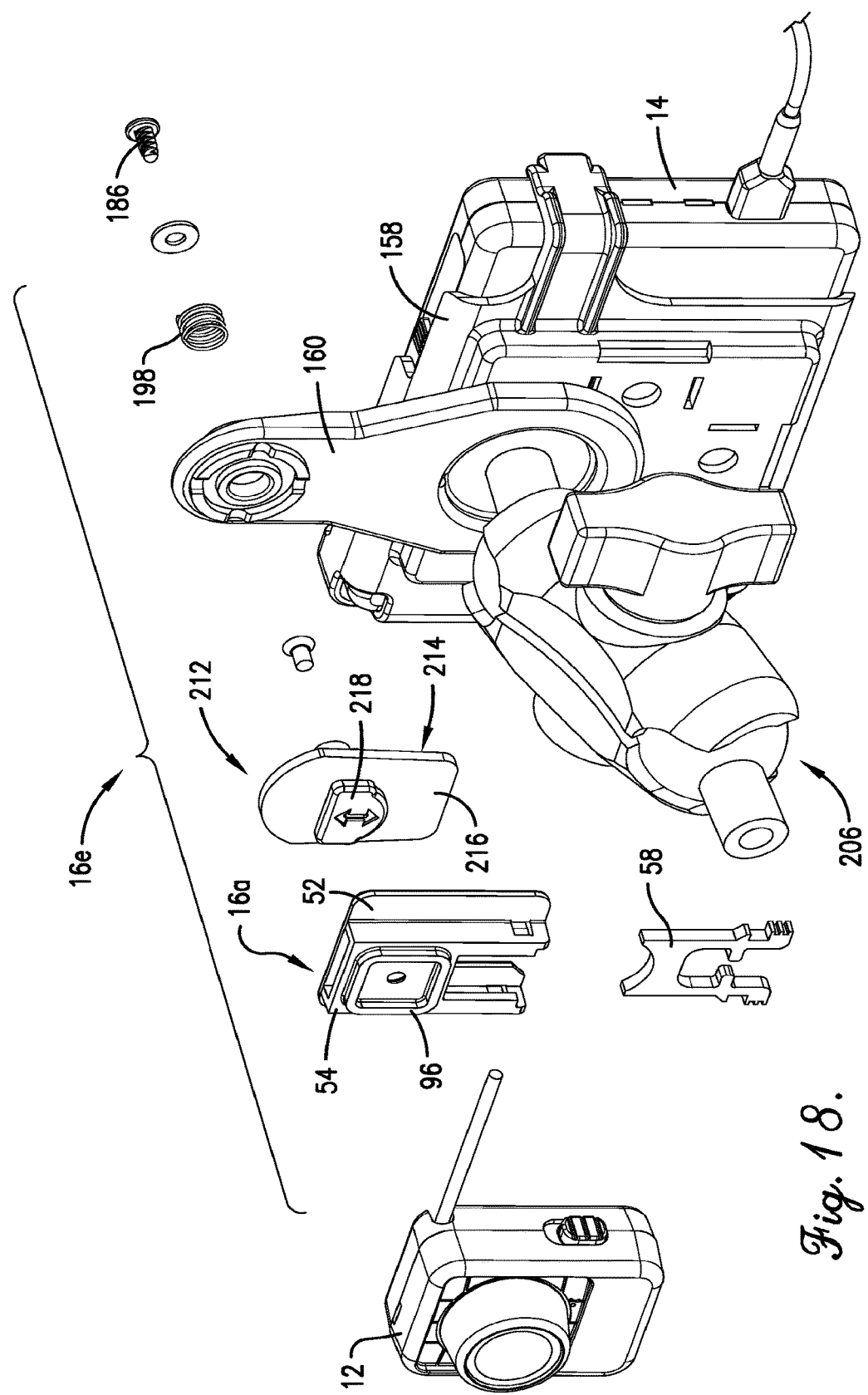
FIG. 18 is a front exploded view of a fifth mounting assembly similar to the fourth mounting assembly of FIG. 13 but particularly illustrating the camera component mounted to the button-mount assembly of FIG. 2.
Figure 20:
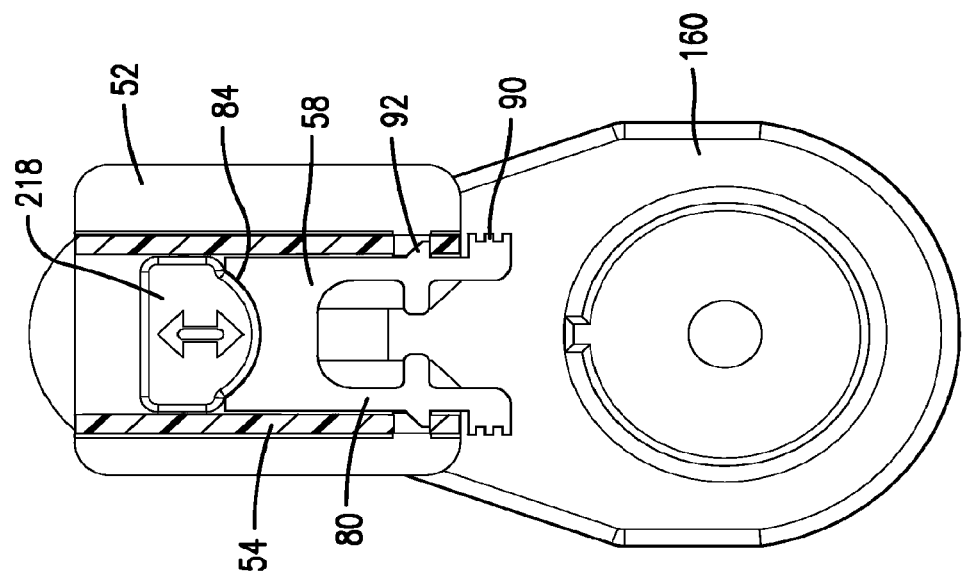
FIG. 20 is a horizontal cross sectional view taken through line 20-20 of FIG. 19 and illustrating a boss secured within the button-mount assembly of FIG. 2.
Figure 19:
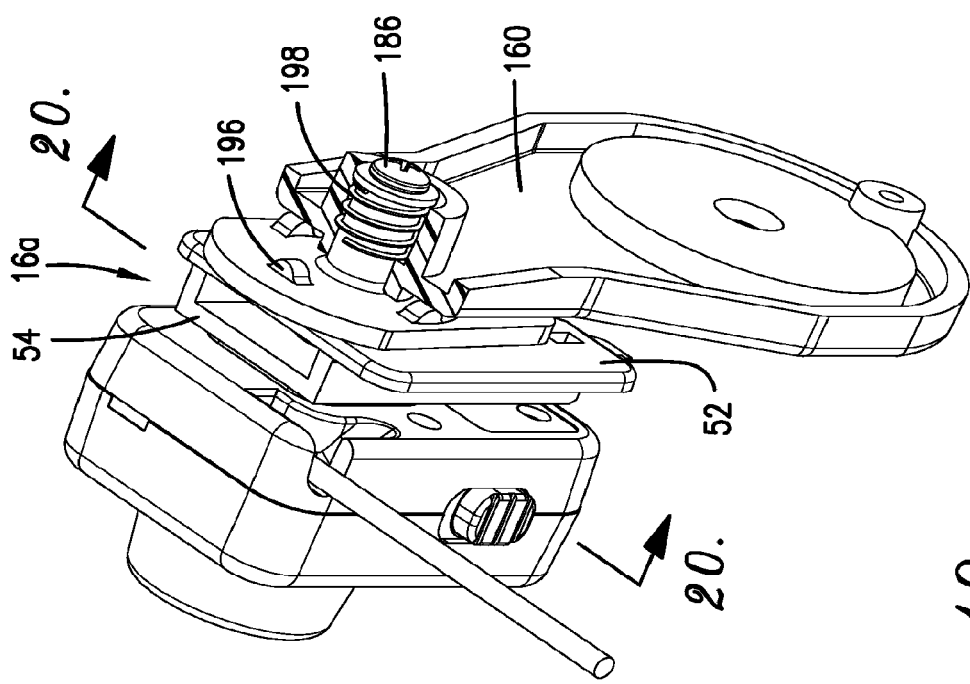
FIG. 19 is a rear perspective view of the camera component mounted by the fifth mounting assembly.

A fifth mounting assembly 16e illustrated in FIGS. 18-20 is substantially similar to the fourth mounting assembly 16d, except that instead of the first clip mounting bracket 162, the mounting assembly 16e includes a button mounting bracket 212 sized and configured to operate with the button-mount assembly 16a. It should be noted that in reference to the figures, like structure is identified with the same reference numeral. The button mounting bracket 212 is operable to be secured to the mounting arm 160 of the fourth mounting assembly 16d and removably retains the camera component 12. The button mounting bracket 212 includes a front face 214 (facing towards the mounting arm 160 when the button mounting bracket 212 is secured to the mounting arm 160) and a rear face 216 (facing towards the rear of the camera component 12 when the camera component 12 is retained on the button mounting bracket 212). The front face 214 of the button mounting bracket 212 is provided with the plurality of detents 196, substantially similar to the first clip mounting bracket 162, that are configured to be received in the plurality of depressions 190 on the circular positioning mount 188 of the mounting arm 160. The button mounting bracket is pivotably secured to the narrow end 178 of the mounting arm 160, as illustrated in FIG. 18 and as described above for the fourth mounting assembly 16d.

The rear face 216 of the button mounting bracket 212 is provided with a large boss 218 that simulates the button to which the button-mount assembly 16a is attached. Thus, it should be understood that the button mounting bracket 212 does not mount to an actual button but rather uses the button-mount assembly 16a to removably couple the camera component housing 30 to the mounting arm 160 via the button mounting bracket 212. That is, when the camera component 12 has the button-mount assembly 16a secured to it, the mounting bracket 54 of mounting assembly 16a is slid over the boss 218, such that the boss 218 fits within the longitudinal track 56 of the mounting bracket 54. The retention clip 58 can then be used to secure the mounting bracket 54 on the boss, as described above for mounting assembly 16a.

Similar to the fourth mounting assembly 16d, the button mounting bracket 212 of the fifth mounting assembly 16e is sized and configured to be pivotably secured to the mounting arm 160, and the mounting arm is in turn secured to the cradle 158. The fifth mounting assembly 16e thus provides for indirectly mounting the camera component 12 to the cradle 158 via the mounting arm 160 without having to remove the button-mount assembly 16a secured to the camera component housing 30. In embodiments, the user is provided with two mounting arms 160, each having either the first clip mounting bracket 162 or the button mounting bracket 212 secured thereto so that the user does not have to remove the respective mounting bracket 162,212.

Figure 21:
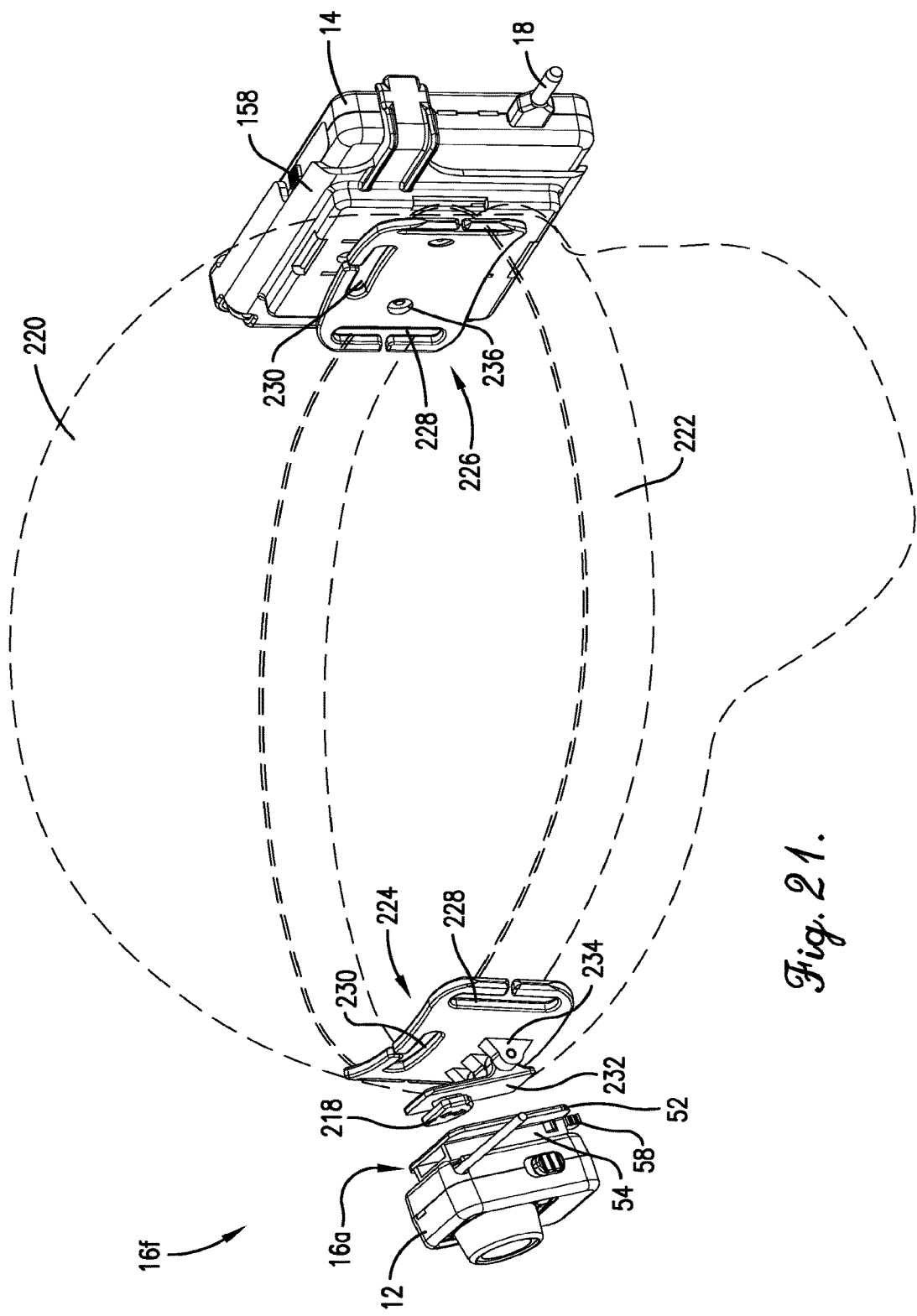
FIG. 21 is an environmental view of a sixth mounting assembly for mounting the system to a user's head or hat.
Figure 22:
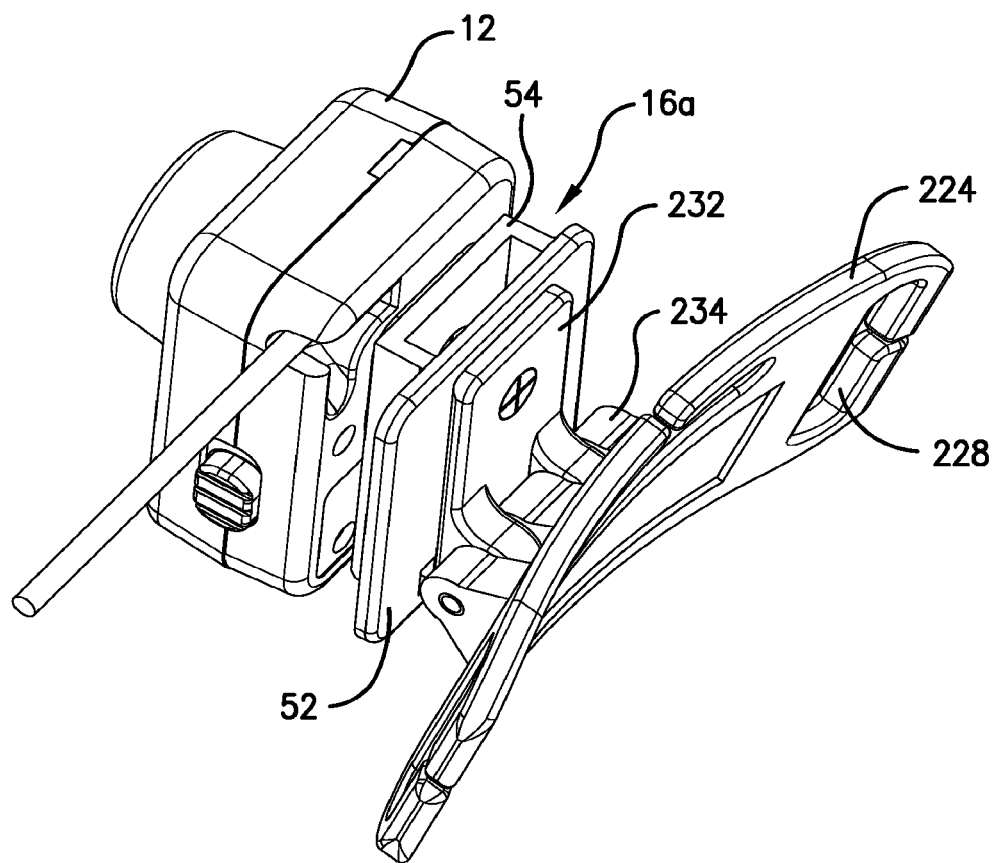
FIG. 22 is a rear perspective view of a portion of the sixth mounting assembly and particularly illustrating mounting of the camera component.

A sixth mounting assembly 16f is illustrated in FIGS. 21 and 22 and is a hat mount for mounting the video recording system 10 to the user's helmet, cap, or other type of hat 220, directly to the user's head, or to an animal, such as a canine. The sixth mounting assembly 16f works in conjunction with a strap 222 that surrounds the hat 220, such as a strap that is buckled or stretchable to fit securely on the hat. The mounting assembly 16f is sized and configured to mount the button-mount assembly 16a described above. That is, when the camera component 12 is secured to the button-mount assembly 16a, the button-mount assembly 16a can be secured to the user's hat 220 via the mounting assembly 16f, such that the camera component 12 is secured to the user's hat. The recording component 14 can also be secured to the user's hat 220 via the mounting assembly 16f. In particular, when the recording component 14 is mounted in the cradle 158 of mounting assembly 16d or 16e, the cradle can be mounted to the hat via the mounting assembly 16f, as further described below.

The mounting assembly 16f broadly comprises a first mounting plate 224 for mounting the camera component 12 and a second mounting plate 226 for mounting the recording component 14. The first mounting plate 224 is slightly concave about a lateral axis to fit snugly against an arcuate crown of the hat 220. The first mounting plate 224 comprises two vertical slots 228 formed in the plate 224 for threading of the strap 222 on the hat 220 therethrough. A third lateral slot 230 is provided along a top end of the plate 224 for a further securement point, if desired. An outward face of the plate 224 includes a hinged backplate 232 for receipt of the button-mount assembly 16a. As illustrated in FIG. 21, the hinged backplate 232 is attached, at its general bottom end, to a general bottom center of the first mounting plate 224 via a hinge 234. The backplate 232 is rotatable along a vertical axis relative to the first mounting plate 224, and in embodiments, pressure actuated by the user is needed to rotate the backplate 232 (that is, the backplate 232 does not rotate easily, such that the attached camera component 12 stays in the desired position). A boss, substantially similar to the boss 218, is located on the hinged backplate 232. Similar to the mounting assembly 16e, the button-mount assembly 16a is secured to the hinged backplate 232 by locating the boss 218 in the longitudinal track of the button-mount assembly 16a.

Referring to FIG. 21, the second mounting plate 226 is similar to the first mounting plate 224, except that the second mounting plate 226 does not include the hinged backplate 232 and instead includes two screw holes 236 for securing the second mounting plate 226 to the cradle 158. In use, the second mounting plate 226 is positioned to a rear or side of the user's head.

Figure 23:
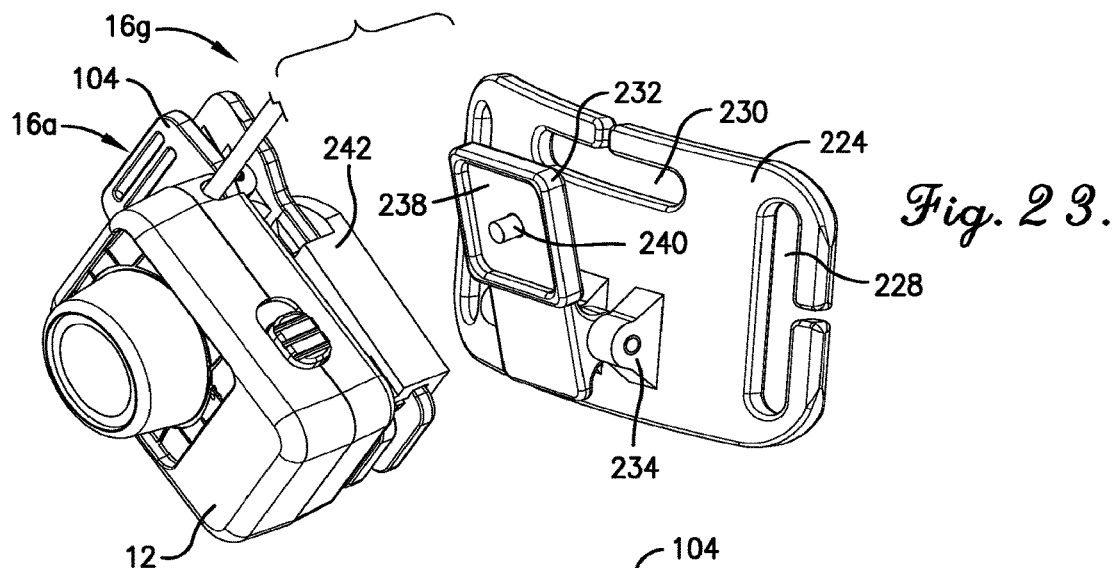
FIG. 23 is a front exploded view of the camera component mounted via the sixth assembly and particularly illustrating a first angle of rotation of the camera component.
Figure 24:
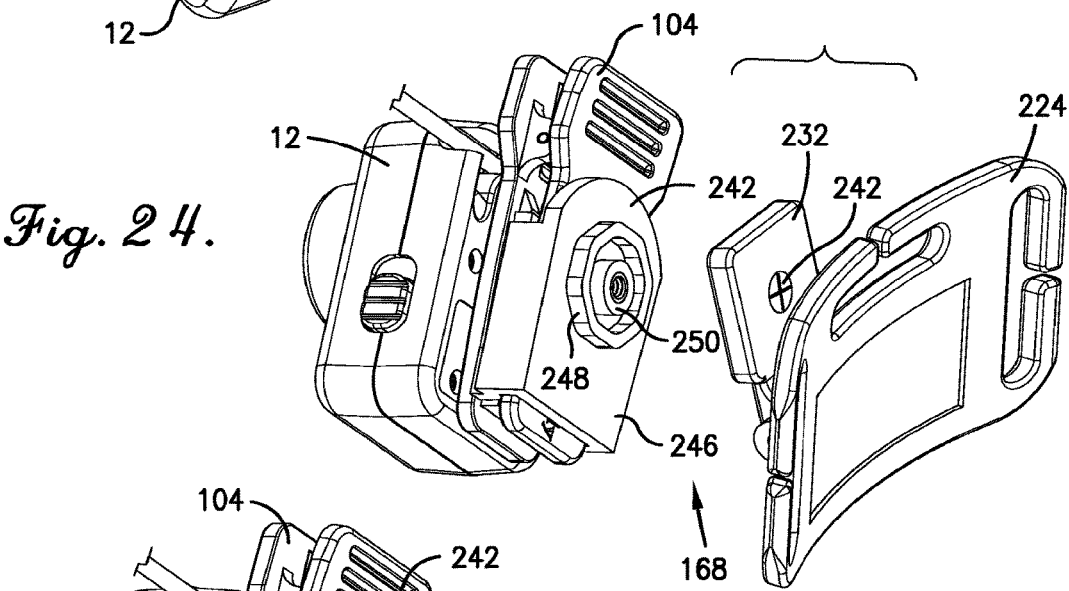
FIG. 24 is a rear exploded view of the camera component mounted via the sixth assembly of FIG. 23.
Figure 25:
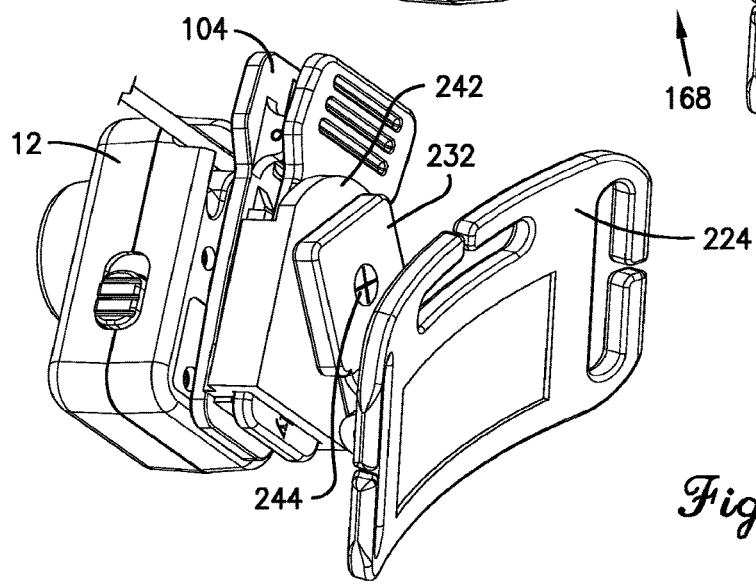
FIG. 25 is a rear perspective view of the camera component mounted by the sixth mounting assembly.

A seventh mounting assembly 16g is substantially similar to the sixth mounting assembly 16f that is a hat mount, except that mounting assembly 16g is sized and configured to mount the camera component 12 when it is attached to the clip 104 of the second mounting assembly 16b. Referring to FIGS. 23-25, the mounting assembly 16g comprises the first and second mounting plates 224,226 that are substantially similar to the first and second mounting plates 224,226 of mounting assembly 16f. The only difference is that instead of the large boss 218, the hinged backplate 232 secured to the first mounting plate 224 includes a recessed seat 238 and a post 240. The seventh mounting assembly 16g further includes a second clip mounting bracket 242 that is substantially similar to the first clip mounting bracket 162, except that a front face 246 of the second clip mounting bracket 242 is provided with an octagonal-shaped seat 248 for interfitting with the recessed seat 238 on the hinged backplate 232. In embodiments, the user can rotate the clip 104 at 45 degree angles relative to the hinged backplate 232. The octagonal-shaped seat 248 assists with locating the clip 104 at the desired angle. In use, the user secures the clip 104 at the desired angle by inserting a screw 244 through a receiving post 250 on the front face 246 of the second clip mounting bracket 242. In alternative embodiments, the clip 104 may be rotatable relative to the hinged backplate 232 without having to screw in position. It should be appreciated that the octagonal-shaped seat 248 could be provided on the hinged backplate 232, and the recessed seat 238 could be provided on the front face 246 of the second clip mounting bracket 242.

Figure 26:
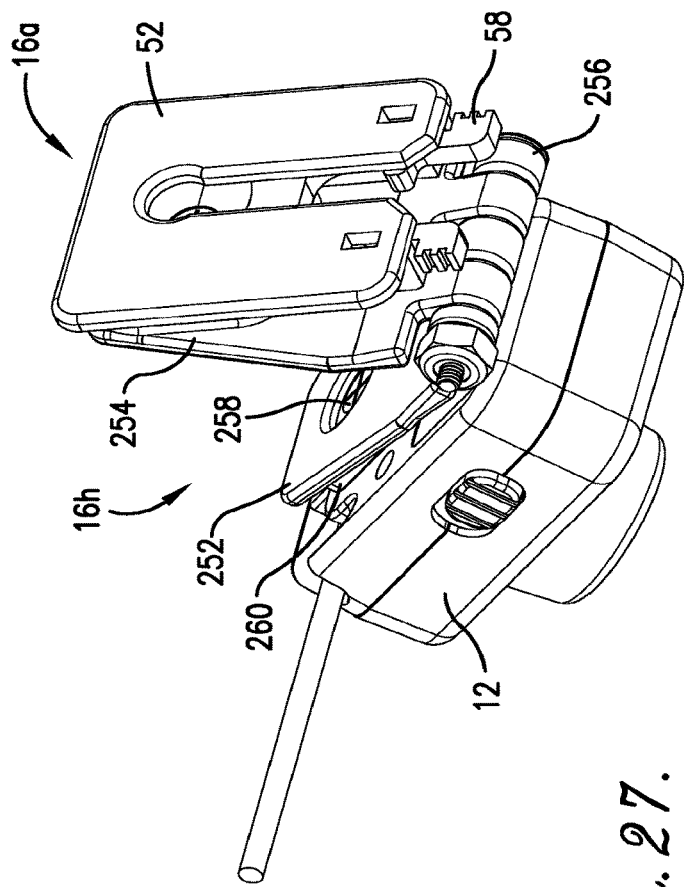
FIG. 26 is a front perspective view of a seventh mounting assembly for mounting the camera component.
Figure 27:
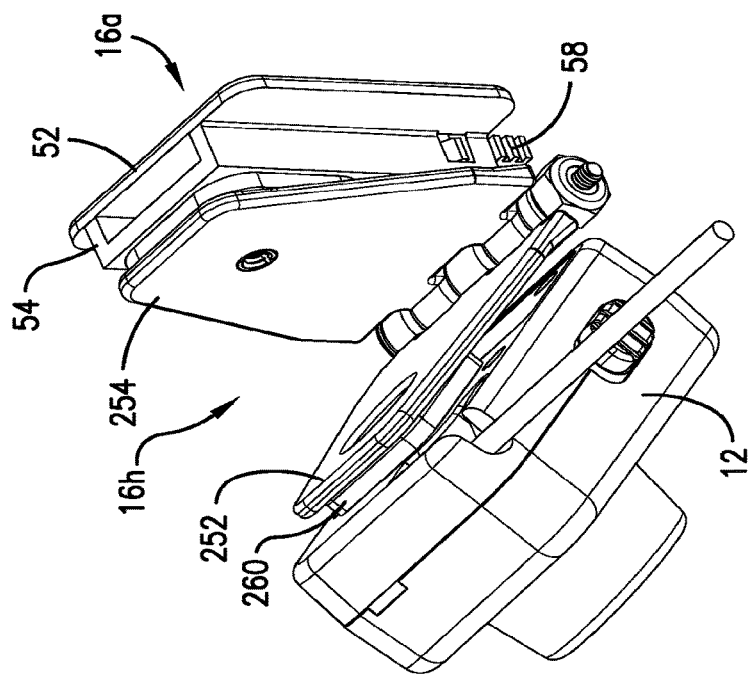
FIG. 27 is a rear perspective view of the seventh mounting assembly of FIG. 26.

In an eighth mounting assembly 16h shown in FIGS. 26 and 27, either of the button-mount assembly 16a or the clip mounting assembly 16b (not shown) is secured to the eighth mounting assembly 16h to provide for angling of the camera component 12 along a vertical axis (i.e., relative to a horizontal plane). The eighth mounting assembly 16h comprises first and second plates 252,254 secured together via a hinge 256. The first plate 252 is secured to the rear of the camera component 12 via a screw 258, and the second plate 254 is secured to either the mounting bracket 54 of the button-mount assembly 16a or the clip 104 of the clip mounting assembly (not shown). An outer face of the first plate 252 (the face closest to the camera component 12) includes a raised seat 260 sized and configured to interfit with the recessed seat 48 on the camera component housing 30. The two plates 252,254 are secured together at their respective bottom ends via the hinge 256. The hinge 256 allows for rotation of one plate with respect to the other plate. In embodiments, the hinge 256 is generally tight, such that it does not easily rotate but instead will only rotate upon pressure being applied by the user against the first plate 252, which is secured to the camera component 12, or the camera component itself.

The user can couple the button-mount assembly 16a to the second plate 254, as shown in FIG. 26. The user can then mount the button-mount assembly 16a to the user's shirt or article of clothing, as described above. The hinged plates 252,254 allow the camera component 12 to be rotated to different angles relative to the horizon. As noted above, the hinged plates 252,254 of the eighth mounting assembly 16h could also be secured to the clip 104 of the second mounting assembly 16b, such that the second plate 254 is secured to the clip 104 via a screw.

Figure 29:
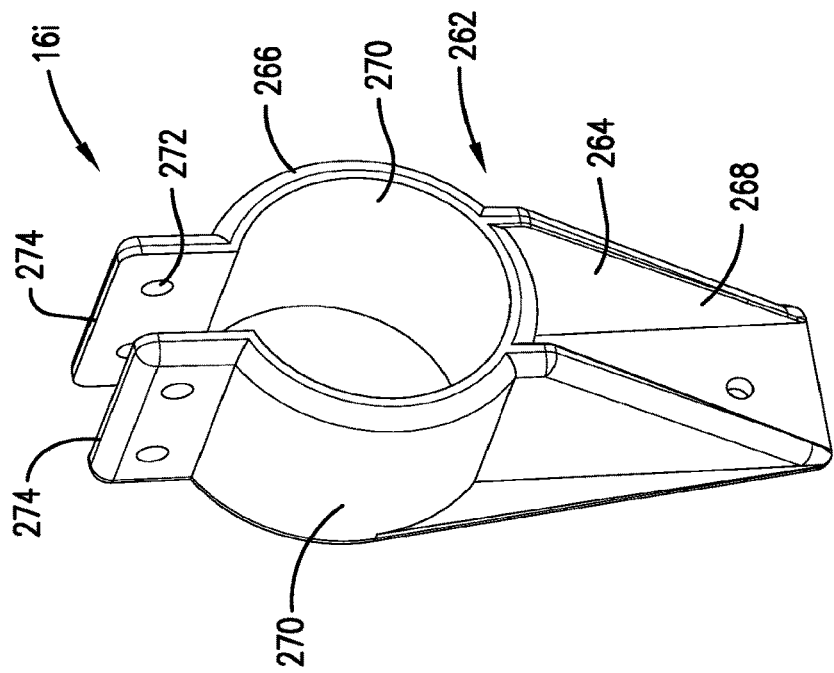
FIG. 29 is a rear perspective view of the eighth mounting assembly of FIG. 28.
Figure 28:
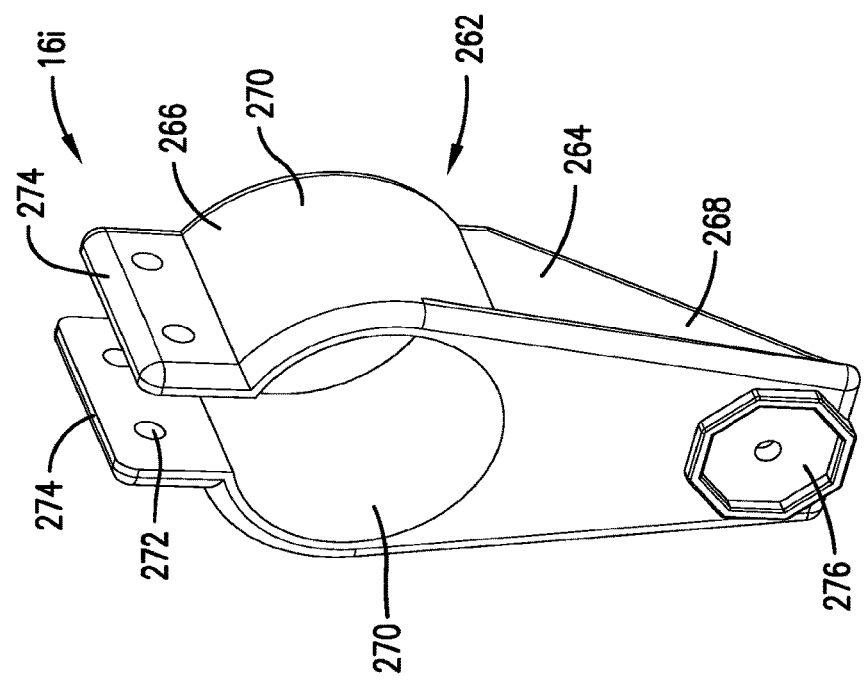
FIG. 28 is a front perspective view of an eighth mounting assembly for mounting the camera component.

Referring now to FIGS. 28 and 29, a ninth mounting assembly 16i comprises a saddle bracket 262 for securing the camera component 12 to a barrel of a firearm (not shown). The saddle bracket 262 includes a body 264 having a top end 266 and a bottom end 268. A general upper half of the body 264 includes two arms 270 that are sized and configured to extend around the barrel of a firearm. The saddle bracket 262 can then be secured to the firearm by inserting two screws (not shown) through openings 272 in two tabs 274 extending from the top end 266 of the bracket 262. The bottom end 268 of the saddle bracket 262 is provided with an octagonal-shaped raised seat 276, similar to the seat 248. The raised seat 276 is configured to receive the second clip mounting bracket 244 of the seventh mounting assembly 16g, similar to how the second clip mounting bracket 244 is secured to the hinged backplate 232 of the first mounting plate 224 of mounting assembly 16g.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A portable video and imaging system for law enforcement comprising:
   a camera configured to capture video of an event and to store the captured video of the event to a memory, wherein said stored video comprises a plurality of video frames of a video file;
   an input actuatable by a law enforcement officer in the field and in response to being actuated, generate an activation signal; and
   a processor programmed to:
   receive said activation signal generated in response to the law enforcement officer actuating the input, and
   in response to the activation signal, store a mark in the video file to identify a point in time or location in the video file,
   wherein said mark in the video file enables the processor to perform the following:
   in response to a user request upon or during playback of the stored video file, automatically advance the playback of the video file to the marked point in time or location in the video file at which the law enforcement officer actuated the input;
   wirelessly transmit the video file to a mobile communications device configured for viewing the video on the mobile communications device; and
   wirelessly transmit the video file to a computer configured for viewing the video at a website.

2. The portable video and imaging system of claim 1, wherein said mark in the video file further includes a geolocation for at least one component of the portable video and imaging system when the input was actuated.

3. The portable video and imaging system of claim 2, wherein the processor is further configured to transmit the video file to the computer via a wired connection.

4. The portable video and imaging system of claim 3, wherein the processor is configured to instruct the camera to begin storing the event in response to receiving information indicative of a triggering event.

5. The portable video and imaging system of claim 4, wherein the camera is mountable in a law enforcement vehicle.

6. The portable video and imaging system of claim 4, wherein the camera is mountable on a body of the law enforcement officer.

7. The portable video and imaging system of claim 2, wherein the computer stores the video file as evidence related to the event.

8. The portable video and imaging system of claim 7, wherein the video file is transmitted to the computer at least in part via a cellular data standard.

9. A portable video and imaging system for law enforcement comprising:
- a camera configured to capture video of an event and to store the captured video of the event to a memory, wherein said stored video comprises a plurality of video frames of a video file,
- wherein the camera is configured to be interchangeably mounted on a law enforcement officer's body and a law enforcement vehicle and includes a plurality of inputs actuatable by the law enforcement officer in the field; and
- a processor associated with the memory and the plurality of inputs and programmed to:
  - upon receiving a first actuation signal indicative of a first actuation of a first input of the plurality of inputs while storing the video file, store a mark in the video file to thereby identify a marked location in the video file,
  - upon receiving a second actuation signal indicative of a second actuation of a second input of the plurality of inputs while playing back the video file, automatically advance the playback of the video file to the marked location in the video file at which the first actuation signal was received,
  - wirelessly transmit the video file to a mobile communications device configured for viewing the video on the mobile communications device, and
  - automatically instruct the camera to initiate storing the event in the video file in response to receiving information indicative of a triggering event.

10. The portable video and imaging system of claim 9, wherein said mark in the video file further includes a geolocation for at least one component of the portable video and imaging system when the input was actuated.

11. The portable video and imaging system of claim 10, wherein the camera is mountable on a body of the law enforcement officer.

12. The portable video and imaging system of claim 10, wherein the camera is selectively mountable in a law enforcement vehicle.

13. The portable video and imaging system of claim 12, wherein the camera is further selectively mountable on a body of the law enforcement officer.

14. The portable video and imaging system of claim 9, wherein the processor is configured to transmit the video file to a computer configured to allow viewing the video at a website as evidence related to the event.

15. The portable video and imaging system of claim 14, wherein the processor is configured to transmit the file to the computer at least partly via a wireless connection.

16. One or more non-transitory computer readable media storing a video file of a law enforcement event, said video file comprising:
- a plurality of frames, each frame including video data of an event,
- wherein said video data is captured by a portable video and imaging system comprising a plurality of cameras, said system encoding a respective plurality of video streams into the video file;
- information indicative of a plurality of marks identifying a corresponding plurality of marked frames of the plurality of frames in the video file,
- wherein each of said plurality marks is initiated by a law enforcement officer actuating an input of the portable video and imaging system,
- wherein said plurality of marks in the video file enables, during playback of the video file, successively advancing the video file to each of the plurality of marked frames at which the law enforcement officer actuated the input; and
- metadata associated with each marked frame of the plurality of marked frames,
- wherein the metadata for each of the marked frames includes a geographical location of at least one component of the portable video and imaging system when the marked frame was captured and a time or date when the marked frame was captured;
- wherein the video file is transmitted to a mobile communications device configured for viewing the video on the mobile communications device.

17. The non-transitory computer readable media of claim 16, further storing information indicative of a triggering signal that initiated storing the video file.

18. The non-transitory computer readable media of claim 16, further storing information indicative of the identity of the law enforcement officer.

19. The non-transitory computer readable media of claim 16, further storing audio of the law enforcement event synchronized to the video file of the law enforcement event.

20. portable video and imaging system of claim 16, wherein the plurality of cameras encode the respective plurality of video streams.

* * * * *